(12) United States Patent
Bettini et al.

(10) Patent No.: US 8,918,881 B2
(45) Date of Patent: Dec. 23, 2014

(54) OFF-DEVICE ANTI-MALWARE PROTECTION FOR MOBILE DEVICES

(71) Applicant: Appthority, Inc., San Francisco, CA (US)

(72) Inventors: Anthony John Bettini, San Francisco, CA (US); Kevin Watkins, San Francisco, CA (US); Domingo J. Guerra, San Francisco, CA (US); Michael Price, San Ramon, CA (US)

(73) Assignee: Appthority, Inc., San Francisco, CA (US)

( * ) Notice: Subject to any disclaimer, the term of this patent is extended or adjusted under 35 U.S.C. 154(b) by 0 days.

(21) Appl. No.: 13/740,051

(22) Filed: Jan. 11, 2013

(65) Prior Publication Data

US 2013/0227636 A1    Aug. 29, 2013

Related U.S. Application Data

(60) Provisional application No. 61/603,146, filed on Feb. 24, 2012.

(51) Int. Cl.
*H04L 29/06* (2006.01)
*H04W 4/00* (2009.01)
*H04W 12/12* (2009.01)

(52) U.S. Cl.
CPC .............. *H04L 63/20* (2013.01); *H04W 4/001* (2013.01); *H04W 12/12* (2013.01); *H04W 4/003* (2013.01)
USPC .................................. 726/24; 726/1; 713/188

(58) Field of Classification Search
CPC ...... H04L 63/20; H04W 4/001; H04W 4/003; H04W 12/12
USPC .......................................... 726/1, 24; 713/188
See application file for complete search history.

(56) References Cited

U.S. PATENT DOCUMENTS

| | | | |
|---|---|---|---|
| 4,755,997 | A | 7/1988 | Takahashi |
| 5,038,348 | A | 8/1991 | Yoda et al. |
| 5,175,856 | A | 12/1992 | Van Dyke et al. |
| 5,291,497 | A | 3/1994 | Ulrich et al. |
| 5,448,737 | A | 9/1995 | Burke et al. |
| 5,790,778 | A | 8/1998 | Bush et al. |

(Continued)

OTHER PUBLICATIONS

Seo, Seung-Hyun et al., "Analysis on maliciousness for mobile applications," 2012 Sixth International Conference on Innovative Mobile and Internet Services in Ubiquitous Computing, pp. 126-129.*

(Continued)

*Primary Examiner* — Michael Pyzocha
(74) *Attorney, Agent, or Firm* — Van Pelt, Yi & James LLP

(57) ABSTRACT

Techniques for off-device anti-malware protection for mobile devices are disclosed. In some embodiments, off-device anti-malware protection for mobile devices includes receiving a software inventory for a mobile device, in which the software inventory identifies a plurality of applications installed on the mobile device; and determining whether one or more of the plurality of applications identified in the software inventory are associated with malware based on a policy. In some embodiments, the off-device anti-malware protection for mobile devices further includes enforcing the policy on the mobile device. In some embodiments, the off-device anti-malware protection for mobile devices is provided as a cloud service.

31 Claims, 12 Drawing Sheets

(56) References Cited

U.S. PATENT DOCUMENTS

| | | | |
|---|---|---|---|
| 5,832,271 | A | 11/1998 | Devanbu et al. |
| 5,854,924 | A | 12/1998 | Rickel et al. |
| 5,946,484 | A | 8/1999 | Brandes |
| 5,966,539 | A | 10/1999 | Srivastava |
| 6,282,698 | B1 | 8/2001 | Baker et al. |
| 6,594,783 | B1 | 7/2003 | Dollin et al. |
| 6,748,584 | B1 | 6/2004 | Witchel et al. |
| 6,886,156 | B2 | 4/2005 | McCormack |
| 7,058,928 | B2 | 6/2006 | Wygodny et al. |
| 7,401,359 | B2* | 7/2008 | Gartside et al. ............. 726/22 |
| 7,752,609 | B2 | 7/2010 | Rioux |
| 7,779,472 | B1* | 8/2010 | Lou ............................ 726/24 |
| 8,756,693 | B2* | 6/2014 | Dube et al. ................. 726/24 |
| 2007/0078990 | A1 | 4/2007 | Hopkins |
| 2007/0258469 | A1 | 11/2007 | Bennett |
| 2007/0294273 | A1 | 12/2007 | Bendeck et al. |
| 2007/0294373 | A1 | 12/2007 | Harrison |
| 2008/0022093 | A1 | 1/2008 | Kurien et al. |
| 2008/0134138 | A1* | 6/2008 | Chamieh et al. .......... 717/105 |
| 2009/0100521 | A1 | 4/2009 | Fu et al. |
| 2009/0282485 | A1 | 11/2009 | Bennett |
| 2010/0037321 | A1* | 2/2010 | Oz et al. .................... 726/24 |
| 2010/0154060 | A1 | 6/2010 | Demblewski |
| 2010/0333168 | A1* | 12/2010 | Herrod ......................... 726/1 |
| 2011/0113491 | A1* | 5/2011 | Altshuler et al. ........... 726/24 |
| 2011/0145920 | A1 | 6/2011 | Mahaffey et al. |
| 2011/0167474 | A1 | 7/2011 | Sinha et al. |
| 2011/0167497 | A1* | 7/2011 | Van de Groenendaal et al. ........................... 726/24 |
| 2011/0321175 | A1 | 12/2011 | Slater |
| 2012/0023065 | A1 | 1/2012 | Deweese et al. |
| 2012/0023584 | A1 | 1/2012 | Yoo |
| 2012/0072991 | A1 | 3/2012 | Belani et al. |
| 2012/0110174 | A1* | 5/2012 | Wootton et al. ............ 709/224 |
| 2012/0110674 | A1* | 5/2012 | Belani et al. ............... 726/25 |
| 2012/0131685 | A1* | 5/2012 | Broch et al. ............... 726/30 |
| 2012/0240183 | A1* | 9/2012 | Sinha ........................... 726/1 |
| 2012/0246484 | A1* | 9/2012 | Blaisdell et al. ........... 713/189 |
| 2012/0270567 | A1 | 10/2012 | Johnson |
| 2013/0007245 | A1* | 1/2013 | Malik et al. ................. 709/223 |
| 2013/0097660 | A1* | 4/2013 | Das et al. .................... 726/1 |
| 2013/0097709 | A1 | 4/2013 | Basavapatna et al. |
| 2013/0212638 | A1* | 8/2013 | Wilson ......................... 726/1 |

OTHER PUBLICATIONS

Ung et al., "Machine-Adaptable Dynamic Binary Translation", Department of Computer Science and Electrical Engineering, 2000, pp. 41-51, Boston, Massachusetts, USA.

Ramsey et al., "A Transformational Approach to Binary Translation of Delayed Branches", ACM Transactions on Programming Languages and Systems, Mar. 2003, pp. 210-224, vol. 25, No. 2.

Gough et al., "An Experiment in Mixed Compilation/Interpretation", 14th Australian Computer Science Conference, Jan. 1992, pp. 1-9, Hobart, Tasmania.

Bergeron et al., "Static Analysis of Binary Code to Isolate Malicious Behaviors", LSFM Research Group, Computer Science Department, Science and Engineering Faculty, 2009, Quebec, Canada.

Bergeron et al., "Static Detection of Malicious Code in Executable Programs", LSFM Research Group, 2009, Quebec, Canada.

Ung et al., "Optimising Hot Paths in a Dynamic Binary Translator", Department of Computer Science and Electrical Engineering, University of Queensland, 2002, QLD, Australia.

Cifuentes et al., "Walkabout—A Retargetable Dynamic Binary Translation Framework", SML Technical Report Series, Jan. 2002, pp. 1-30, Sun Microsystems Laboratories, USA (Version 1).

Choi et al., "Techniques for Debugging Parallel Programs with Flowback Analysis", ACM Transaction Programming Languages and Systems, Oct. 1991, pp. 491-530, vol. 13, No. 4, ACM.

Cifuentes et al., "Computer Security Analysis through Decompilation and High-Level Debugging", 2001, pp. 375-380, IEEE.

Cifuentes et al., "Decompilation of Binary Programs", Software—Practice and Experience, Jul. 1995, pp. 811-829, vol. 25, Brisbane, Australia.

Cristina Cifuentes, "Reverse Compilation Techniques", 1994.

Cristina Cifuentes, "Structuring Decompiled Graphs", Department of Computer Science, 1996, Hobart, Australia.

Cifuentes et al., "UQBT: Adaptable Binary Translation at Low Cost", Mar. 2000, pp. 60-66.

Duesterwald et al., "A Demand-Driven Analyzer for Data Flow Testing at the Integration Level", Department of Computer Science University of Pittsburgh, 1996, pp. 575-584.

Fosdick et al., "Data Flow Analysis in Software Reliability", Computing Surveys, Sep. 1976, vol. 8, No. 3, Boulder, Colorado, USA.

Author Unknown, "History of Decompilation", 1998.

Ung et al., "SRL—A Simple Retargetable Loader", Centre for Software Maintenance, 1997.

Cifuentes et al., "Preliminary Experiences with the Use of the UQBT Binary Translation Framework", Department of Computer Science and Electrical Engineering, 1999, Brisbane, Australia.

Cifuentes et al., "Specifying the Semantics of Machine Instructions", Department of Computer Science and Electrical Engineering, Technical Report 422, Dec. 1997, Brisbane, Australia.

Cifuentes et al., "The Design of a Resourceable and Retargetable Binary Translator", 1999.

Cristina Cifuentes, "Partial Automation of an Integrated Reverse Engineering Environment of Binary Code", The University of Queensland Department of Computer Science, 1996, Brisbane, Australia.

Troger et al., "Analysis of Virtual Method Invocation for Binary Translation", 2002.

Cifuentes et al., "Procedural Abstraction Recovery from Binary Code", Department of Computer Science and Electrical Engineering, Technical Report 448, Sep. 1999, Brisbane, Australia.

Cifuentes et al., "Binary Translation: Static, Dynamic, Retargetable?", 1996.

Cifuentes et al., "Intraprocedural Static Slicing of Binary Executables", Centre for Software Maintenance, 1997, Brisbane, Australia.

Cristina Cifuentes, "Interprocedural Data Flow Decompilation", Department of Computer Science, 1996, Hobart, Australia.

Cristina Cifuentes, "A Structuring Algorithm for Decompilation", School of Computing Science, 1993, Bisbane, Australia.

Cifuentes et al., "A Methodology for Decompilation", School of Computing Science, 1993, Brisbane, Australia.

Lo et al., "Towards a Testbed for Malicious Code Detection", Division of Computer Science, 1991, pp. 160-166, Davis, California, USA.

Alme et al., "McAfee Anti-Malware Engines: Values and Technologies", 2010, McAfee Inc.

Cifuentes et al., "Recovery of Jump Table Case Statements From Binary Code", Science of Computer Programming, Feb. 2001, pp. 171-188, vol. 40.

Ung et al., "Dynamic Binary Translation Using Run-Time Feedbacks", Science of Computer Programming, Nov. 16, 2005, pp. 189-204, vol. 60.

Bergeron et al., "Detection of Malicious Code in COTS Software: A Short Survey", 1999, Canada.

Cifuentes et al., "Experience in the Design, Implementation and Use of the Retargetable Static Binary Translation Framework", Jan. 2002, Sun Microsystems Inc.

Zhao et al., "Program Dependence Analysis of Concurrent Logic Programs and Its Applications", Department of Computer Science and Communication Engineering, 1995, Fukuoka, Japan.

Cifuentes et al., "Walkabout — A Retargetable Dynamic Binary Translation Framework", SML Technical Report Series, Jan. 2002, pp. 1-30, Sun Microsystems Laboratories, USA (Version 2).

* cited by examiner

FIG. 4

- FILE MD5: 314B4516793879B21C822AFB5A718A15
- FILE SHA-1: 0D72075CB3E9D2BAA35FB78E3DFF969C514BF2CB
- APPLICATION FILE SIZE: 682201
- APPLICATION VERSION: 1.0
- SUBMISSION RECEIVED: 2012-04-27 16:55:08 UTC
- ANALYSIS PROGRESS: 100% COMPLETE
- SCANNED WITH ENGINE VERSION: 2.2.0
- SCANNED WITH RULE SET VERSION: 1.6.0

RISKY BEHAVIORS:

- THIS APPLICATION WASN'T COMPILED AS A POSITION INDEPENDENT EXECUTABLE (PIE) WHICH CAN EXPOSE THE APPLICATION TO MEMORY CORRUPTION ATTACKS.
- THIS APPLICATION WASN'T FOUND ON THE OFFICIAL APPLE APP STORE. THE ORIGINS OF THIS APPLICATION CANNOT BE VERIFIED.

PRIVACY BEHAVIORS:

- THIS APPLICATION INCLUDES FILE PATHS TO SOURCE CODE FILES IN DEBUG INFORMATION STORED WITHIN THE APPLICATION EXECUTABLE IMAGE. THESE PATHS OFTEN INCLUDE USERNAMES OR OTHER INFORMATION RELATED TO THE DEVELOPER OF THE APPLICATION. THIS INFORMATION COULD BE USED TO ASSIST IN TARGETING THE APPLICATION DEVELOPER OR DEVELOPMENT COMPANY.
- THIS APPLICATION INCLUDES FILE PATHS TO SOURCE CODE FILES IN DEBUG INFORMATION STORED WITHIN THE APPLICATION EXECUTABLE IMAGE. THESE PATHS OFTEN INCLUDE USERNAMES OR OTHER INFORMATION RELATED TO THE DEVELOPER OF THE APPLICATION. THIS INFORMATION COULD BE USED TO ASSIST IN TARGETING THE APPLICATION DEVELOPER OR DEVELOPMENT COMPANY.

HOSTNAME AND IP ADDRESSES:

| HOSTNAME/ADDRESS | REPUTATION |
|---|---|
| HTTPS://APPRAMP.APPERIAN.COM/PUBLIC-EASE-SDK.INTERFACE.PHP | N/A |
| IDAP://LOCALHOST/ | N/A |
| HTTPS://WWW.APPLE.COM/APPLECA/0 | N/A |
| HTTP://WWW.APPLE.COM/APPLECA/0 | N/A |

APPERIAN HOME   PRIVACY POLICY

FIG. 5 (Cont.)

OFF-DEVICE ANTI-MALWARE PROTECTION FOR MOBILE DEVICES

CROSS REFERENCE TO OTHER APPLICATIONS

This application claims priority to U.S. Provisional Patent Application No. 61/603,146 entitled OFF-DEVICE ANTI-MALWARE PROTECTION FOR MOBILE DEVICES filed Feb. 24, 2012, which is incorporated herein by reference for all purposes.

BACKGROUND OF THE INVENTION

An application, also referred to as an "app," generally refers to a software application that executes on a computing device, such as a mobile device. For example, mobile devices include smart phones, tablets, laptops, and/or other mobile devices. Various application platforms exist for different operating systems, such as Microsoft Windows® platforms, Google Android® platforms, and Apple iOS® platforms. Application markets exist for each of these application platforms, which can make available thousands to millions of different apps for such platforms.

For example, various apps are available for executing on smart phones such as the HTC EVO® or Apple iPhone®, tablets such as the Motorola Xoom® or Apple iPad®, embedded devices executing the Google Android® operating system such as those shipped by Mentor Graphics and their partners, and computer operating systems such as Apple Mac OS X® and Microsoft Windows 8®.

BRIEF DESCRIPTION OF THE DRAWINGS

Various embodiments of the invention are disclosed in the following detailed description and the accompanying drawings.

FIG. 4 is a screen diagram of an apps view of a user interface for a platform for quantifying risks of apps for mobile devices in accordance with some embodiments.

DETAILED DESCRIPTION

Figure 1:
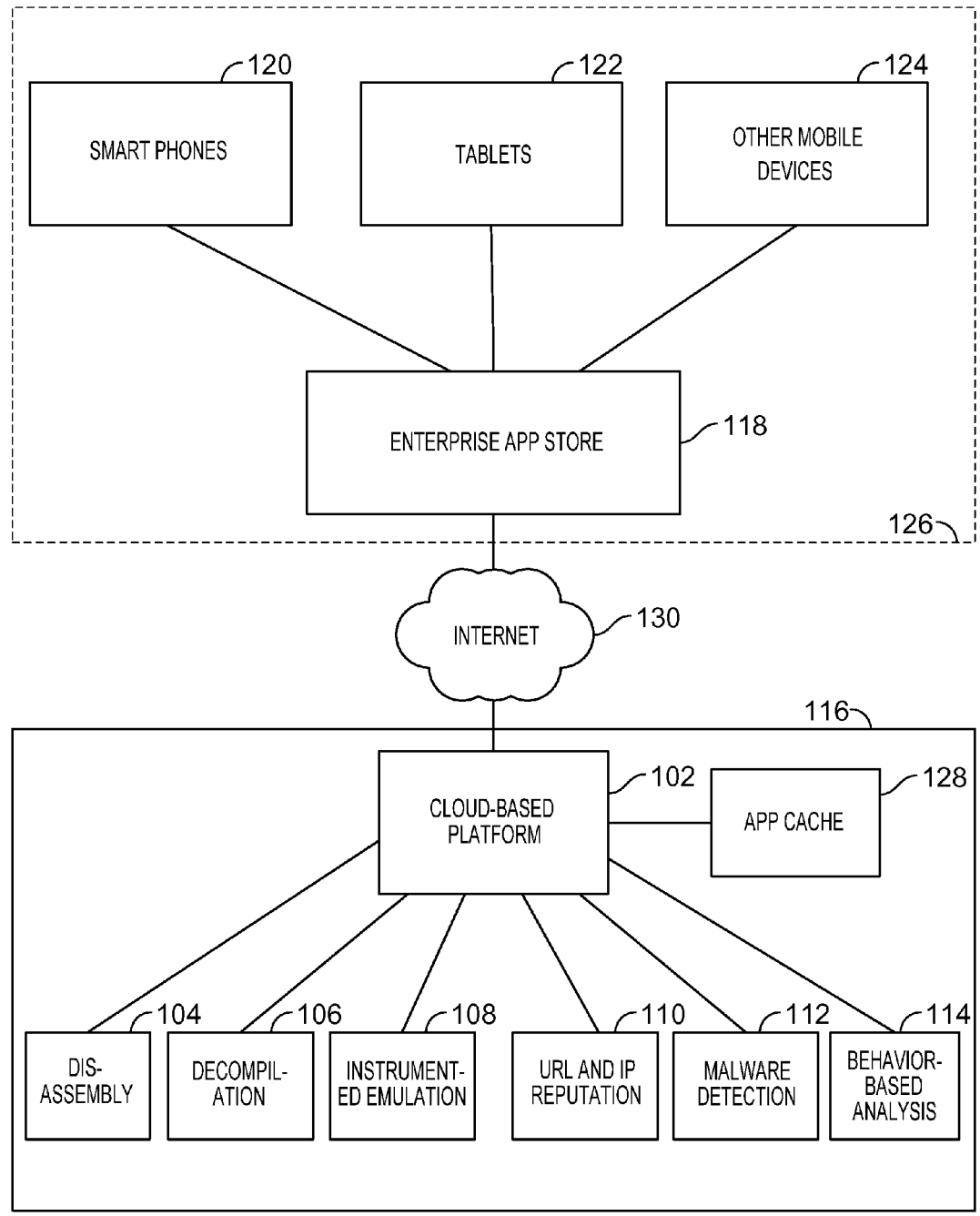
FIG. 1 is a functional block diagram of an architecture for quantifying the risks of applications ("apps") for mobile devices in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An application, also referred to as an "app," generally refers to a software application that executes on a computing device, such as a mobile device (e.g., a mobile device refers to a computing device that includes a processor for executing a software application). For example, mobile devices include smart phones, tablets, laptops, and/or other mobile devices. Various application platforms exist for different operating systems, such as Microsoft Windows® platforms, Google Android® platforms, and Apple iOS® platforms. Application markets (e.g., app stores) exist for each of these application platforms, which can make available thousands to millions of different apps for such platforms.

For example, various apps are available for executing on smart phones such as the HTC EVO® or Apple iPhone®, tablets such as the Motorola Xoom® or Apple iPad®, embedded devices executing the Google Android® operating system such as those shipped by Mentor Graphics and their partners, and computer operating systems such as Apple Mac OS X® and Microsoft Windows 8®.

Also, as these operating system platforms for mobile devices converge with legacy computer desktop and laptop operating system platforms (e.g., Microsoft Windows® 8 and Apple Mac OS X®), similar app markets and availability of common apps across such platforms are becoming increasingly common.

With hundreds of thousands to millions of different apps for such platforms available to consumers, enterprises (e.g., various entities, including corporate entities, government entities, and other entities) are confronted with supporting and/or managing these various devices that can have a variety of such apps on users' devices. Enterprise challenges include the increasing usage by, for example, employees of their own devices that can have access to corporate resources (e.g., employee smart phones, tablets, etc.). The ever growing number and variety of apps also poses a significant challenge for entities to manage and monitor the downloading, installation, and usage of such apps by users on devices that can have access to corporate resources.

However, the trend towards using these apps for enterprise uses and/or on devices that may have enterprise access also presents new and complex challenges for enterprises (e.g., Information Technology (IT) at enterprises and/or management for such enterprise's information and technology) and for consumers to understand risks posed by such apps. In particular, these apps can present various risks to the enterprise and/or users.

For example, apps can have access to enterprise resources, such as a corporate address book, corporate intellectual property, corporate Wi-Fi network(s), VPN access, and/or various other enterprise resources. Because apps can have access to corporate resources, it is desirable for the enterprise to understand and quantify the risks associated with apps that have been downloaded or can be downloaded to devices used by, for example, employees of the entity or other users who have access to any enterprise resources (e.g., on the mobile device and/or on the enterprise network).

Mobile devices present unique challenges as a majority or significant amount of the mobile malware and risky behaviors are delivered through apps (e.g., payloads with apps). In particular, app markets expose the undesirable trends of increasing malware present in various apps or vulnerabilities of such apps that can be exploited by malware or sophisticated attacks (e.g., intrusions, etc.), privacy risks (e.g., spyware or other malware), resource usage (e.g., CPU, memory, storage, battery, network, and/or other physical device resources), and/or other intellectual property related risks (e.g., data loss, intellectual property theft, etc.) exposed by such apps and/or vulnerabilities present in such apps. As the app market evolves and sophistication of the security risks increase, the approach of only using blacklists is generally insufficient to address these evolving security related challenges of apps for mobile devices.

Enterprises (e.g., companies, governmental organizations, and/or other entities) generally support employees and other users (e.g., contractors, guests, and/or other users associated with the enterprise) who use various types of mobile devices at work, such as smart phones, tablets, laptops, and/or various other types of mobile devices. However, provisioning anti-malware and/or enforcing enterprise customized anti-malware policies by provisioning anti-malware on each such device can be a cumbersome and often futile task as employees may bring their own devices to work (BYOD) and/or frequently replace or upgrade such devices.

However, with more and more mobile apps showing up on mobile devices such as smart phones, tablets, laptops, and/or embedded devices, enterprises and users want to be ensured that the apps installed on their mobile devices do not include malware. Many if not most malware for mobile devices are delivered using apps as payloads for getting such malware installed/executed on the mobile device.

In addition, on many mobile devices, particularly smart phones, tablets, and embedded devices, the devices themselves can be resource constrained (e.g., limited CPU capabilities, limited memory capabilities, limited storage, and/or strong dependency on the battery). These resource limitations can put tight constraints on resource-intensive operations, such as malware detection systems. For example, many malware detection systems rely upon emulation or dynamic analysis (e.g., running the software within the context of an instrumented emulator), which can be a very resource intensive operation. As a result, this operation, because of both hardware resource constraints and software sandboxing common on mobile devices, makes traditional dynamic analysis "on-device" impractical and/or undesirable. To further limit "on-device" malware detection, permission models implemented on the mobile device can restrict a level of access to successfully analyze arbitrary apps for malware behaviors. However, there is still a need to detect new and unknown malware, in an ever growing number and diversity of apps available for mobile devices (e.g., through public and/or private/enterprise app stores).

Also, there are no existing solutions for using a device-based solution to generate an app inventory on certain types of mobile devices. For example, there are no existing solutions for using a device-based solution to generate an app inventory on Apple iOS®-based devices, because the Apple iOS® sandbox on the device does not permit an app inventory (e.g., listing of apps installed on the device) to be generated (e.g., any apps in the Apple app store must comply with the Apple iOS® sandbox rules, which do not permit generating such an app inventory). As a result, there are no existing device-based anti-malware solutions that perform anti-malware app scanning available for iOS®-based devices.

Traditional anti-malware solutions operate "on-device," meaning the file or application being checked for malware is checked for malware on the same device that the application is expected to run on. More specifically, traditional anti-malware solutions leverage on-device or on-system static analysis to decide if a file, executable, or application is malware or not. What are needed are techniques for performing anti-malware analysis for apps installed on mobile devices using out-of-band or "off-device" techniques.

Thus, techniques for off-device anti-malware solutions for mobile devices are needed. Accordingly, various techniques for providing off-device anti-malware protection for mobile devices are disclosed. In some embodiments, off-device anti-malware protection for mobile devices includes receiving a software inventory for a mobile device, in which the software inventory identifies a plurality of applications installed on the mobile device; and determining whether one or more of the plurality of applications identified in the software inventory are associated with malware based on a policy. In some embodiments, the off-device anti-malware protection for mobile devices further includes enforcing the policy on the mobile device. In some embodiments, the software inventory for the mobile device is received at a cloud service for providing off-device anti-malware protection for mobile devices. In some embodiments, the policy includes one or more of the following: a malware policy, a privacy policy, and an enterprise configured app security policy.

In some embodiments, the software inventory is received from a mobile device management (MDM) service. In some embodiments, a mobile device management (MDM) provisioning profile is installed on the mobile device, and the MDM provisioning profile generates the software inventory for the mobile device. In some embodiments, a mobile device management (MDM) provisioning profile is installed on the mobile device, the MDM provisioning profile periodically generates an updated software inventory for the mobile device, and the periodically updated software inventory for the mobile device is communicated to a cloud service for providing off-device anti-malware protection for mobile devices. In some embodiments, a mobile device management (MDM) provisioning profile is installed on the mobile device, the MDM provisioning profile periodically generates an updated software inventory for the mobile device, the mobile device periodically synchronizes with a mobile device management (MDM) service to provide an updated software inventory for the mobile device, and the periodically updated software inventory for the mobile device is communicated from the MDM service to a cloud service for providing off-device anti-malware protection for mobile devices. In some embodiments, a certificate is installed on the mobile device and the certificate is used to generate the software inventory that is communicated to a service for providing off-device anti-malware protection for mobile devices.

In some embodiments, the mobile device is an Apple iOS®-based device, a certificate is installed on the mobile device, and the certificate is used to generate the software inventory that is communicated to a service for providing the off-device anti-malware protection for mobile devices.

In some embodiments, off-device anti-malware protection for mobile devices further includes enforcing the policy on the mobile device. In some embodiments, off-device anti-malware protection for mobile devices further includes sending results of determining whether one or more of the plurality of applications identified in the software inventory are associated with malware based on the policy to a mobile device management (MDM) service, in which the MDM service enforces the policy by performing an action (e.g., uninstalling/removing, disabling, sending a warning to a user and/or to information technology (IT) for the enterprise) or performing some other corrective or responsive action(s) with respect to one or more applications on the mobile device that were identified as being associated with malware based on the policy.

In some embodiments, off-device anti-malware protection for mobile devices further includes determining an application is risky based on the policy. In some embodiments, off-device anti-malware protection for mobile devices further includes determining an application is in violation of one or more aspects of the policy.

In some embodiments, off-device anti-malware protection for mobile devices includes receiving store app metadata to verify whether apps in the enterprise app store comply with a policy (e.g., a malware policy, an enterprise policy, and/or another mobile app policy), such as using techniques described herein.

In some embodiments, off-device anti-malware protection for mobile devices includes receiving one or more apps prior to the containerization or sandboxing process to verify whether such apps comply with a policy (e.g., a malware policy, an enterprise policy, and/or another mobile app policy), such as using techniques described herein.

In some embodiments, the off-device anti-malware protection for mobile devices includes automatically analyzing a plurality of applications for a mobile device platform to determine whether any of the plurality of applications violates an anti-malware policy; and generating a data feed identifying one or more of the plurality of applications that were determined to be associated with malware based on the anti-malware policy. In some embodiments, the off-device anti-malware protection for mobile devices further includes sending the data feed to a plurality of subscribers. For example, the data feed can report apps that exhibit one or more undesirable behaviors and/or attributes, such as malware, privacy (e.g., location tracking), behaviors that exceed the authorized scope of user permissions, and/or other behaviors/attributes that violate a policy (e.g., an application risk policy). In some embodiments, the data feed is provided to an enterprise for enforcing the anti-malware policy on mobile devices used to access data resources in the enterprise, in which the policy includes one or more of the following: a malware policy, a privacy policy, and an enterprise configured application security policy. In some embodiments, the data feed is provided to a mobile device management (MDM) service for enforcing the anti-malware policy on a plurality of mobile devices managed by the MDM service.

In some embodiments, the off-device anti-malware protection for mobile devices further includes using a platform for assessing risks for apps (e.g., for a plurality of different mobile device platforms), such as described herein with respect to FIGS. 1-7. For example, the off-device anti-malware protection for mobile devices can use the platform to perform automated scanning of a plurality of applications ("apps") for a plurality of different mobile device platforms (e.g., operating system platforms, such as Apple iOS®, Google Android®, and Microsoft Windows®) based on a policy (e.g., an application risk policy that can include a malware policy). For example, the platform can continually monitor various public app stores to identify new apps and/or new versions of apps to upload and scan. The platform can cache the results for scanned apps (e.g., based on a policy, such as a malware policy). Accordingly, the off-device anti-malware protection for mobile devices can use the platform's scanned app cache results to efficiently compare an app inventory for a particular mobile device with the previously cached results for scanned apps to determine whether any of the apps identified in the app inventory are deemed risky (e.g., violate an aspect of a policy, such as a malware policy). If an app identified in the app inventory does not match any previously scanned apps, then the platform can upload a copy of that app (e.g., from a public app store, a private app store, or the device) and scan that app to determine whether the app is in compliance with a malware policy. Similarly, if an app identified in the app inventory has not been previously scanned based on a particular enterprise customized policy, then the platform can upload a copy of that app (e.g., from a public app store, a private/enterprise app store, or the device) and scan that app to determine whether the app is in compliance with that particular enterprise customized policy.

FIG. 1 is a functional block diagram of an architecture for quantifying the risks of applications ("apps") for mobile devices in accordance with some embodiments. As shown, a platform 116 is provided for quantifying the risks of apps for mobile devices that is in communication with an enterprise network 126 via the Internet 130. The enterprise network 126 includes an enterprise app store 118 (e.g., an enterprise that has its own internal app store for providing apps for mobile devices used by its users, such as its employees, contractors, etc.) that provides apps for enterprise mobile devices, including smart phones 120, tablets 122, and/or other mobile devices 124 (e.g., laptops, etc.). For example, using the various techniques described herein, the platform 116 can be used to automatically assess the risks of apps being distributed by the enterprise app store 118 (e.g., based on a policy, such as an enterprise risk policy/profile). Accordingly, the platform 116 screens all apps that are available in the enterprise app store 118.

In some embodiments, the platform 116 implements a holistic approach to screening apps, and can automatically analyze apps for mobile devices to determine various properties, such as one or more of the following: market reputation of the app; presence of malware; insecure programming practices; malicious changes to existing apps; data exfiltration; corporate intellectual property (IP) impacts; cryptographic weakness or implementation faults; security risks; privacy concerns (e.g., location tracking, extracting contact book, sharing browsing history, etc.); energy usage (e.g., CPU cycles measured and compared with apps in similar categories or other versions of the same app, such as Facebook app version X v. version Y); and network usage. For example, these techniques performed by the platform 116 can be implemented as a fully automated solution for quantifying the risks of apps for mobile devices that can increase the detection of known malware, screen for new and/or unknown malware, identify risks in operating systems (e.g., including the Google Android® operating system and the Apple iOS® operating system), and can integrate with a mobile device management (MDM), app store, and integrated development environment (IDE) solutions.

In some embodiments, the platform 116 implements the holistic approach to screening apps using a phased implementation to risk assessment of apps for mobile devices. As shown, the platform 116 includes a cloud-based platform 102. For example, the cloud-based platform 102 can provide a global app cache (e.g., the platform 116 can service a plurality of enterprise app stores), including an app cache 128 for caching results for previously analyzed apps as shown in FIG. 1. The cloud-based platform 102 is in communication with a series of data collection engines, including: a disassembly engine 104, a decompilation engine 106, an instrumented emulation engine 108, a URL and IP reputation engine 110, a malware detection engine 112, and a behavior-based analysis engine 114. For example, the platform can include various engines, such as shown, for performing various functions and collecting various data based on the functions, which can be used for later app risk assessment and analysis as well as shared with one or more of the various other engines, such as described herein with respect to various embodiments.

In some embodiments, the platform 116 for quantifying the risk of apps has the following characteristics: varying a number of phases of data collection and analysis, depending upon the platform and type of app; a series of phases of analysis that run, for purposes of collecting data, followed by a collection of rules that then process the collected data; rules that identify behaviors, characteristics, or properties, which present risks to the enterprise or consumer; and a report generation phase, in which the relevant findings/results from the rules execution phase are reported to end users (e.g., the enterprise and consumers).

Figure 2:
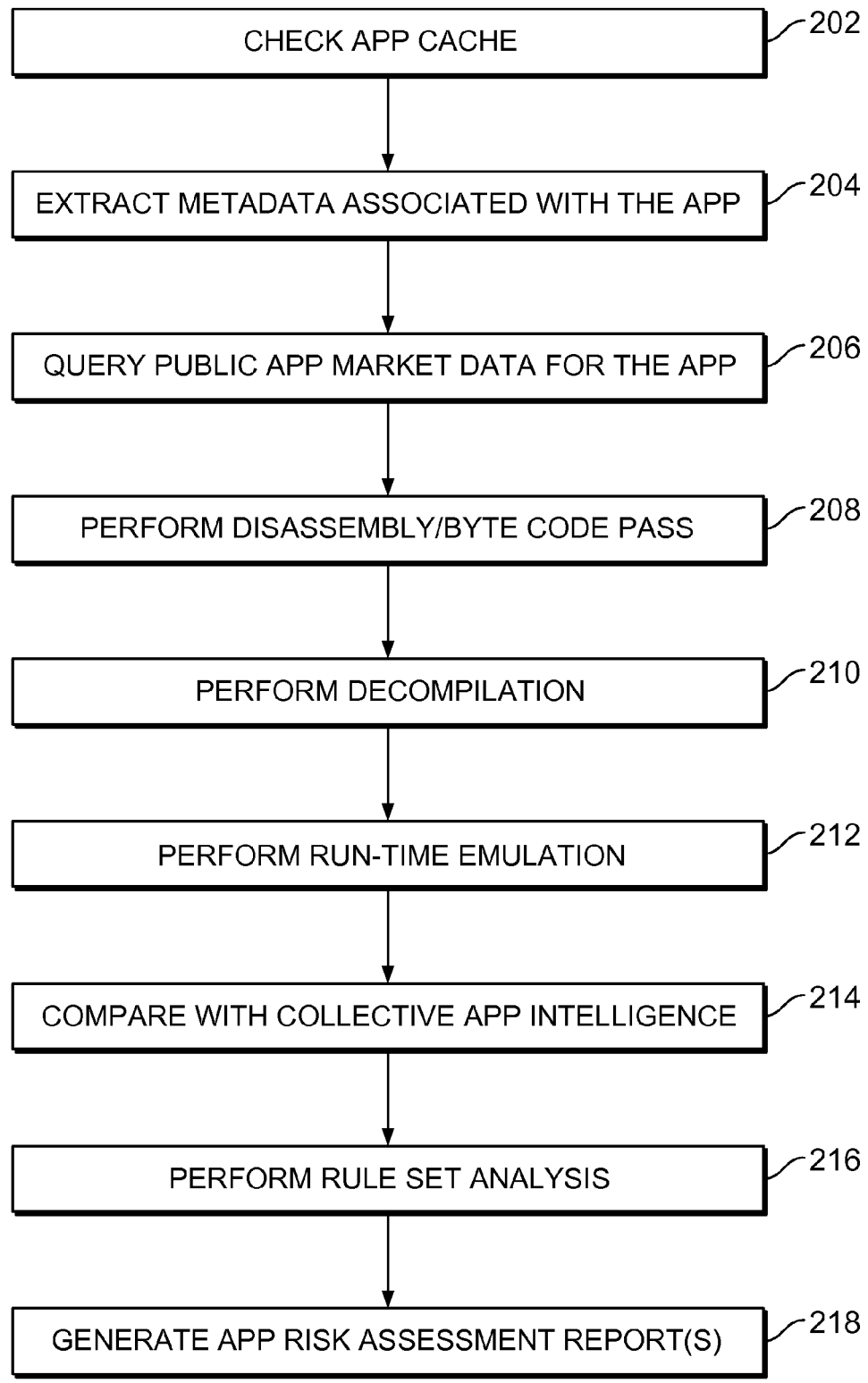
FIG. 2 is a flow diagram for quantifying the risks of apps for mobile devices in accordance with some embodiments.

FIG. 2 is a flow diagram for quantifying the risks of apps for mobile devices in accordance with some embodiments. In some embodiments, a platform for quantifying the risks of apps for mobile devices implements a phased approach to risk assessment of apps for mobile devices. In some embodiments, the phased approach includes one or more of the phases as shown in FIG. 2 and discussed in detail below. In some embodiments, the platform for quantifying the risks of apps for mobile devices uses a series of data collection engines for implementing the phased approach, such as shown in FIG. 1.

In some embodiments, an app query to the platform for quantifying the risks of apps for mobile devices initiates the process. For example, an enterprise app store (e.g., enterprise app store 118 as shown in FIG. 1, which can be implemented using a commercially available MDM solution) can communicate with a cloud service/web platform for quantifying the risks of apps for mobile devices (e.g., platform 116 as shown in FIG. 1) using a web service (e.g., RESTful web API or REST API) to communicate an app (e.g., one or more apps for the enterprise app store) that is to be automatically analyzed for a risk assessment by the cloud service/platform. In some embodiments, the Rest API supports auth tokens for providing authorization and authentication of such app queries to provide a secure communication mechanism. At 202, in response to the app query, a pre-screen analysis phase is performed that includes checking an app cache (e.g., a cache that includes information for apps that were previously analyzed by the platform). In some embodiments, if the platform has already analyzed that app (e.g., that particular version of the app), then the previously determined risk score (e.g., app reputation score and possible additional data) is returned (e.g., at near wire speed). This approach highlights the value of pre-screening apps (e.g., several hundreds of thousands of apps can have already been pre-screened by the platform using these techniques).

In some embodiments, after uploading an application (e.g., an App container) using the Rest API, an application ID number is returned. For example, the application ID number can be used as a key to view the results or to perform more advanced analysis. In some embodiments, various fields are used including the following: an application data field is used to identify the app file; and an origin field is used to set the source (e.g., origin) of an app. For example, the origin field can be set to "public" or "private" depending on where the application came from, with "public" indicating that the app is from a public source (e.g., a public app store) and "private" indicating that the app is primarily used internally and not meant for general consumption. Among other restrictions, apps marked as private can be hidden from global app cache queries.

In some embodiments, the returned app ID can be used for subsequent queries based on the app ID, such as for reports based on one or more provided App IDs (e.g., individual app query—reporting on an individual app based on a request to find a specified app in the global cache, bulk app query—reporting on a plurality of apps based on a bulk request to find apps in the global cache, updated reports, and/or more advanced reports). In some embodiments, polling is supported to determine when the platform has completed the analysis of an app (e.g., based on a specified app ID) and that a report is ready based on the completed analysis by the platform. In some embodiments, querying (e.g., using the Rest API) the platform to find applications that have already been analyzed by the platform and are stored in the global app cache (e.g., app cache 128 as shown in FIG. 1) are supported (e.g., comparing an app file hash to hash stored in the global app cache, querying by the app name, and/or using various other techniques), as described in further detail below.

In some embodiments, such app queries will have already been analyzed by the platform and, thus, will trigger a near wire speed response to such app queries. In particular, in many cases the app will already be part of the app cache (e.g., app cache 128 as shown in FIG. 1) and already analyzed. In some embodiments, to check if the app is already in the app cache, all that is needed is a hash of the application (e.g., using a hashing algorithm, such as MD5, SHA-1, SHA-256, or another hashing algorithm) to query the app cache for a match.

In some embodiments, an app query specifies one or more of the following: a unique ID for the transaction, a match type (e.g., all to return all app matches, latest to return a newest app match), platform (e.g., Google Android platform, Apple iOS platform, Microsoft Windows platform, etc.), app name, app version, package name (e.g., package name for Android apps, bundle identifier for iOS apps), source of the app (e.g., enterprise or device), app size (e.g., Android APK file size, iOS bundle size), app size memory (e.g., iOS dynamic size), app hash (e.g., such as MD5, SHA-1, SHA-256, or another hashing algorithm), app signature (e.g., a signature for Android apps), item ID (e.g., iOS 9-digit number specific to iOS apps, Android Market asset ID for Android apps), and local (e.g., specifying the language of the report data).

Below is an example query to the platform from an app catalog (e.g., an app store, such as an enterprise app store).

API Name: query_app
API Description: queries one individual app, returns one result; does not require a sequence number; similar format to bulk_query_app; can produce findings based on incomplete metadata
Type of HTTP call: POST
Parameters: [0 required, 13 optional]
    sequence_num (optional) (a unique ID for the transaction)
    platform (optional) {Android, iOS, Windows, etc.}
    app_name (optional) (Name of the app)
    app_version (optional) (Version of the app)
    package (optional) (Package name for Android apps; Bundle Identifier for iOS apps [may be referred to as URL/URIs])
    app_location_source (optional) {enterprise, device}
    app_size_disk (optional) (Android APK file size; iOS Bundle Size)
    app_size_memory (optional) (C Dynamic Size)
    app_hash_md5 (optional) (MD5 of the APK/XAP file itself; on iOS, MD5 of the app executable, which is contained within the IPA [ZIP] archive)
    app_hash_sha1 (optional) (SHA-1 of the APK/XAP file itself; on iOS, SHA-1 of the app executable, which is contained within the IPA [ZIP] archive)
    app_hash_sha256 (optional) (SHA256 of the APK/XAP file itself; on iOS, SHA256 of the app executable, which is contained within the IPA [ZIP] archive)
    app_signature (optional) (Specific to Android, looks like: ZdKozWeudHKt2VwVCFpH8dMi2hE)
    item_id (optional) (9-digit # that is specific to iOS apps; on Android Market asset id)

The above example is an example of querying one individual app. As further described herein with respect to various embodiments, the platform also supports "bulk queries" whereby, for example, a customer (e.g., an app store/app catalog, the MDM server, the MAM app catalog, etc.) can submit to the app risk assessment platform the metadata on a plurality of apps (e.g., hundreds to thousands of apps at a time), and the platform replies with the results for each of the analyzed apps.

In some embodiments, a customer of the service for quantifying the risks of apps for mobile devices can query the platform as described herein. In some embodiments, each customer can create users for the organization, which may have varying permissions. For example, the corporate IT team of ACME Corporation can have one or more users that have accounts with access to the platform. The corporate IT team can also configure their account to have specific IT requirements for apps scanned on behalf of ACME Corporation (e.g., custom scanning, and/or custom reporting requirements, such as based on security requirements, privacy requirements, and/or various other criteria as described herein). The corporate IT team can also create scripts that automatically query the platform for reports on apps being considered for adding to the enterprise app store, including existing apps (e.g., previously scanned apps), updated versions of existing apps, and/or new apps. Using these techniques, the corporate IT team can effectively manage the enterprise app store to ensure that the apps available in the enterprise app store satisfy their corporate IT requirements (e.g., security, privacy, device integrity, network integrity, etc.).

In particular, if the app already exists in the app cache (i.e., there is a match to the query of the app cache), then the pre-existing app ID will be returned. Otherwise, that is, if the app cache check does not result in a match or hit, then processing continues to stage 204, which is discussed below.

In some embodiments, a phased analysis is performed by the platform for quantifying the risks of apps for mobile devices, in which data is collected at each phase or stage of analysis by the platform for a given app being analyzed for a risk assessment. At 204, metadata associated with the app is extracted. In particular, metadata associated with the app can include information that is important for assessing the overall risk(s) associated with the app. For example, this phase can include parsing an XML file associated with the app that hosts general app information. Metadata associated with the app that can be analyzed includes app permissions, intents, services, and receivers. In particular, this phase can include mapping out app permissions, file and version name, app author, app ID, package name, and/or various other attributes and/or metadata associated with the app. In some embodiments, this stage further includes inspecting app components including accepting a component of an app, such as a metadata file or an executable image, absent in the remainder of the app, to analyze and generate any potential findings based on the parsed and analyzed metadata associated with the component of the app. As discussed further below with respect to stage 206, metadata associated with finding the app on the public and/or private app markets includes artist and publisher information, item IDs, genre IDs or categories, price for purchasing the app, release date of the app (e.g., app version), software version external identifiers, and vendor ID.

At 206, a query of public app market data for the app is performed. In particular, querying the public market(s) for data on the app can facilitate significant information about an app's risk based on an analysis of the public market data identified as associated with the app (e.g., using app descriptions, app rankings in the store, vendor reputations, and/or various other types of information). For example, various app attributes and/or metadata can be compared with such data for apps in public app markets. In particular, public app markets are generally available to consumers, such as Apple's App Store, Amazon's and Google's Android App Market, Microsoft's App Store, and other public app stores, unlike enterprise app markets which are generally only available to permitted enterprise users, such as enterprise employees and contractors. In some embodiments, the query of public app market data includes the following types of data (e.g., to facilitate analyzing whether such enterprise apps being analyzed have been repackaged with malware, such as a different version of an Angry Birds® app that has been re-packaged with malware): app size, content, version, and/or various other types of data. In some embodiments, analytics are performed on the app download count, user ratings, and developer reputation data. For example, for Android-based apps, each app's manifest can be deobfuscated (e.g., using Android APIs) and parsed to extract information of interest and for further analysis, as described above.

There are various examples in which this phase for querying of public app market data for the app can assist in determining an overall risk assessment for the app. As an example, a source of the app (e.g., which app market or app markets it's available from) can have an impact on an overall app risk, because some app markets are known to be riskier than other app markets. As another example, a new app with fewer downloads can have a higher risk than an older app with a larger number of downloads. As another example, an app developer's reputation can also have an impact on an overall app risk assessment. As another example, an average user rating can also have an impact on overall app risk assessment.

As another example, an app's file name, version, and app size can be compared between the publicly available app and the app submitted by the enterprise. If these fields vary, then these results indicate that the app may have been repackaged, which can also have an impact on overall app risk assessment (e.g., as such can indicate that the app could have been repackaged with a higher app risk). As another example, given that apps are typically signed by a developer with a private key and include information on who created the key, if an app is signed and includes different information than the publicly available app, this determination can also have an impact on overall app risk assessment (e.g., as such, can also indicate that the app could have been repackaged with a higher app risk).

In some embodiments, an app is uniquely identified using various techniques. For example, a hash of the app file (e.g., for Android app files, this can be a hash of the container; for iOS app files, this can be a hash of a .ipa file, which is an iPhone application archive file that stores an iPhone app, which is usually encrypted with Apple's FairPlay DRM technology), a hash of the executable, and/or a bundle ID can be used to uniquely identify each app. As an example, this information can be used to compare an app received in a query to the platform to compare it with previously analyzed apps to determine if there is a match with the previously analyzed apps.

In some embodiments, the platform attempts to correlate apps for the Apple iOS® operating system that are received (e.g., from app queries, for apps that are in enterprise app stores and/or are uploaded by users/customers) with apps that have been pre-collected by the platform and that have already been uploaded and analyzed by the platform. As discussed above, iOS-based apps generally include an executable program. In some embodiments, the platform decrypts any such executables included in an iOS-based app prior to uploading them. For example, if a user submits an app from the App Store that includes an encrypted executable, it would not normally match a previously uploaded app, as that app's executable would have been decrypted and, thus, would not be the same. In some embodiments, to solve this problem, the platform performs a series of comparisons, including the following: hashing the pre-collected app (e.g., the app container, including all contents), and comparing this to a hash of the newly uploaded app. If this hash matches, no further work is required. If a match is not made, then the executables for both the new and pre-existing apps are compared. For example, to make comparison of executables more likely to succeed, the platform can save the hash for both the encrypted as well as the unencrypted executable for every pre-collected app, and can then compare a hash of the newly uploaded app's executable to both of these values. If there is a match, then no further work is required. Otherwise, metadata from both apps including the app's "bundle identifier" and version can be compared, and if a match is made, no further work is required. Accordingly, using these three different matching techniques, it is possible to reliably match newly uploaded apps to apps previously uploaded to the platform, whether their executables re-encrypted or not.

In some embodiments, handling of DRM-related mechanisms, such as executable image encryption, is also provided using various techniques. In particular, if an app that is received by the platform is encrypted using DRM technology (e.g., apps for the iOS platform can be encrypted using DRM technology), then various approaches can be used to facilitate processing the app using the various phases and collection/analysis engines described herein with respect to various embodiments. In some embodiments, the platform can handle the encryption of apps in one of a variety of ways. An example technique that the platform can perform is to correlate the encrypted app with an unencrypted version of the app to match the app with such an unencrypted version of the app, such as based on the digital signature (e.g., a hash, such as using MD5, SHA-1, SHA-256, or another hashing algorithm) of the encrypted executable image of the app. As another technique, the platform can also decrypt the encrypted app on native hardware (e.g., leverage one or more iOS devices that have previously been jail broken to decrypt the apps natively at run-time). As yet another technique, the platform can decrypt the encrypted app using pure software decryption leveraging private keys from the operating system or native hardware.

At 208, a disassembly/byte code pass of the app is performed to provide a static analysis phase (e.g., as apps are typically provided by the enterprise app stores/public app stores only in executable formats). In some embodiments, a disassembly/byte code pass phase is performed using a disassembler, such as a disassembly engine (e.g., disassembly engine 104 as shown in FIG. 1). In some embodiments, a disassembly/byte code pass phase includes inspecting byte code or assembly language (e.g., if applicable) to determine what the app is supposed to do—how it is coded to perform. For example, native instructions and virtual machine (VM) byte codes can be processed and analyzed. In some embodiments, this phase includes extracting a control flow graph, method and function names, strings, data flow within the app's executable, and/or other information to facilitate a static analysis and/or to facilitate providing a source code conversion for the app, as discussed below in detail with respect to stage 210. For example, app methods, such as encryption methods, can be analyzed for risky behaviors (e.g., using hard-coded passwords to protect private data or calling methods with risky encryption algorithms). As another example, the static analysis phase can include determining whether certain behaviors are implemented by the app (e.g., performing an operation without user permission, such as sending text/SMS messages without a user's permission, using GPS/location services without a user's permission, and/or various other behaviors of potential interest, such as those described herein with respect to various embodiments). As yet another example, native instructions and VM byte codes can be processed and analyzed, and such can also be used to facilitate a source code conversion (e.g., decompilation phase) as further discussed below in detail with respect to stage 210.

At 210, a decompilation phase is performed to facilitate generating a source code version of the app (e.g., apps are typically provided by the enterprise app stores/public app stores only in executable formats). In some embodiments, a decompilation phase is performed using a decompilation engine (e.g., decompilation engine 106 as shown in FIG. 1). In some embodiments, the decompilation phase includes analyzing a software code path and mapping an app action tree. For example, this information can be used to facilitate dynamic analysis using such behavior code path information determined from the source code analysis. For example, this information can be used to compare actual behaviors to permission and intent requests. As another example, the dynamic analysis phase can include simulated behavior to monitor the app's behavior for determining whether certain behaviors are performed by the app (e.g., performing an operation without user permission, such as sending text/SMS messages by monitoring/intercepting attempts to send SMS messages, such as by hooking SMS calls in an Android framework for Android-based apps, and/or various other behaviors of potential interest, such as those described herein with respect to various embodiments). As yet another example, app analysis can also include performing decompilation (e.g., in the case of Android, java files) to identify risky behaviors, such as risky usage of private data and app usage of known risky method calls. In addition, such information can also be used by researchers to easily read and create new rules when an app is flagged as potentially risky.

In some embodiments, a web-based crawling engine for web apps is provided. In some embodiments, this technique includes running through a web-based code coverage tree and testing out available behaviors from the web app. Data is collected during the process so that behavioral rules can be applied to the data findings. Initially, the process enumerates through the web application (crawling), in the form of a discovery phase, to spider the web application looking for as many possible code paths in the tree as possible. Then the dynamic analysis is leveraged and fuzzing occurs (e.g., using a series of engines and rule sets) to find vulnerabilities, risk behaviors, and privacy concerns in the web application.

At 212, a run-time emulation is performed to provide a dynamic analysis phase (e.g., performing dynamic analysis using instrumented emulation). In some embodiments, a run-time emulation phase is performed using an instrumented emulation engine (e.g., instrumented emulation engine 108 as shown in FIG. 1). In some embodiments, the run-time emulation phase includes executing the app on one or more emulators (e.g., virtual machines or emulators, such as a platform version of Android provided using such emulators that simulate an Android app execution environment, in which apps executed in such an environment cannot detect that they are executing in an Android emulation environment as opposed to executing on an actual user's Android mobile device). For example, the dynamic analysis phase can monitor and analyze internal and external app API calls, including kernel level API calls. The dynamic analysis phase facilitates performing a deeper dive into risky behaviors that otherwise can be hidden from a static analysis (e.g., such as new components being downloaded during run-time/execution of the app and/or other suspicious and/or potentially malicious behaviors).

In some embodiments, a dynamic analysis (e.g., instrumented emulation) includes hosting a series (e.g., farm) of emulators, in which instrumenting as part of our analysis is provided. On some platforms, these are forked versions of open source operating systems, in which API hooks into the kernel, virtual machine, system calls, etc. are provided to monitor the apps executed in the emulated environment. On some platforms, a custom kernel and re-implemented standard libraries are used to allow the closed-source operating system apps to monitor the apps executed in the emulated environment. On some platforms, hooking and performing binary patching on "simulators" to monitor the apps are executed in the emulated environment. Once the app is executing in the emulated environment, the dynamic analysis phase collects data on API calls that occur (e.g., and the values returned from those APIs), so that a rule set can be applied to that data set. For example, correlating API calls to permissions can be determined using various static and dynamic techniques described herein to determine whether the app exhibits any behaviors that exceed or are outside the scope of authorizations—proper user permissions. In some embodiments, the apps are instrumented during run-time execution using a combination of one or more of the following: random behaviors, intents from other apps, and control flow graph(s) maps that attempt to reach certain API calls.

At 214, a comparison with collective app intelligence is performed to provide an app reputation phase. In some embodiments, a comparison with collective app intelligence phase is performed using a URL and IP reputation engine (e.g., URL and IP reputation engine 110 as shown in FIG. 1). For example, the collective app intelligence engine can monitor and extract information (e.g., scraping such information from these various app markets/app stores) on various apps and associated app developers across public (e.g., legitimate markets for apps) markets and private (e.g., grey/black markets for apps), which can be used to compare apps between such various markets, including with versions of apps on private app markets. In some embodiments, the app reputation phase includes running new app findings over an entire app library. Thus, this phase facilitates leveraging findings from previous apps to a new scan. In some embodiments, collective app intelligence can include receiving third party analysis input, such as third party input identifying known bad or suspicious IP addresses, URL addresses, SMS numbers, telephone numbers, ad network providers, apps, app developers, app stores, and/or any other information. In some embodiments, the app reputation phase includes comparing reputation data for IP addresses (e.g., the IP reputation, such as IP addresses known to be associated with downloading malware and/or IP addresses known to be associated with command and control (C&C) botnet activities), URL/URI addresses (e.g., the URL/URI reputation, such as URL/URI addresses known to be associated with downloading malware and/or URL/URI addresses known to be associated with command and control (C&C) botnet activities), SMS numbers (e.g., SMS number blacklists), telephone numbers (e.g., telephone number blacklists), ad network providers, and other external calls and/or other information associated with apps. Accordingly, the app reputation phase allows the automated platform to become more and more intelligent with each new app scan as it continues to increase its knowledge about apps, app developers, ad network providers, and related information.

At 216, a rule set analysis is performed to provide a malware detection phase and a behavior-based analysis phase. In some embodiments, a malware detection phase and a behavior-based analysis phase are performed using a malware detection engine and a behavior-based analysis engine (e.g., malware detection engine 112 and behavior-based analysis engine 114 as shown in FIG. 1). In some embodiments, the behavior-based analysis phase includes running data extracted over each phase of analysis through an extensive set of behavioral rules. The behavior-based analysis phase can be used to determine if the app includes previously known malware, exhibits new malware behaviors, and/or if the app otherwise poses a risk, (e.g., privacy, security, or other risks). In some embodiments, enterprise specific (e.g., custom) rules are performed (e.g., enterprise defined risks, based on an enterprise risk profile). For example, enterprise specific (e.g., custom) rules can include checks for HIPAA compliance for healthcare apps, checks for encryption requirements for data management, and various other types of enterprise specific rules.

In some embodiments, using these phases, a series of data collection engines provided by the platform can extract relevant data about the app, which is then fed to a rules engine. The rules engine extracts relevant data from the information discovered by the other engines for further analysis, processing, and/or as input into an overall risk assessment based on an applicable risk profile.

At 218, an app risk assessment report is generated based on the risk assessment for the analyzed app or a bulk set of apps. In some embodiments, the app risk assessment report is generated for the customer based on a risk profile (e.g., an app risk policy) and general or default reporting requirements. In some embodiments, the app risk assessment report is generated for the customer based on an enterprise risk profile (e.g., enterprise customized app risk policy) and/or customized reporting requirements. In some embodiments, the app risk assessment includes various summary findings as well as supporting data. For example, the app risk assessment can include an app reputation score and/or other relevant or supporting data.

In some embodiments, the app risk assessment report is generated as a HyperText Markup Language (HTML) report. In some embodiments, the app risk assessment report is generated as a JavaScript Object Notation (JSON) report. In some embodiments, the app risk assessment report is generated in a format specified by a custom enterprise profile. For example, ACME Corporation can configure their reports to be automatically generated as a JSON report. As another example, Jane, who is in corporate IT for ACME Corporation, can configure her reports to be provided as HTML reports, and Mary, who is also in corporate IT for ACME Corporation, can configure her reports to be provided as JSON reports. Various other customizations for reporting format and categories of information can also be provided.

As discussed above, the platform for quantifying the risks of apps for mobile devices uses a series of data collection engines (e.g., as shown in FIG. 1) for implementing the phased approach. For example, using the series of data collection engines for collecting various data, such as discussed above, various new rules can be applied to extract interesting behaviors or characteristics in apps for performing a risk assessment of such apps.

In some embodiments, the phased approach facilitates implementing a feedback loop in which information determined during one phase can affect actions performed in a different phase. For example, information learned from a static analysis phase can affect activities performed in a dynamic phase. For example, if the static analysis phase for a given app includes library calls for performing SMS/text messaging, then during the dynamic phase, emulation tests can include attempting to determine whether the app attempts to send any SMS/text messaging and if it does so with or without previously gaining the user's permission to send SMS/text messages. Various other examples for leveraging a feedback mechanism to enhance the efficiency and effectiveness of the phased approach should now be apparent to one of ordinary skill in the art in view of the various embodiments described herein.

For example, in the byte code analysis and decompilation phases, the platform can determine that an individual app sends a text message via seeing SMS APIs used. The platform can also feed this information to the dynamic analysis engine, so that the emulator can watch for the SMS to be sent or can instrument the emulator to send the SMS text. Once the SMS is sent, the platform can record the number the SMS was sent to, and the SMS message itself. At the collective intelligence phase, the SMS number monitored/detected by the dynamic engine can then be compared to a list of SMS numbers used in malware apps that communicate with paid SMS numbers (e.g., a common malware monetization scheme is to use such paid SMS numbers). If a match is found, then the platform can determine that the app should be classified as malware and a report can be provided showing all of the supporting data.

Various examples of app behaviors that impact app riskiness are provided. For example, whether the app is determined to include malware impacts the app risk assessment. In particular, this includes both known malware (e.g., previously identified malware), repackaged malware, new malware used in targeted attacks, and malware behavior.

As another example, whether the app accesses websites/ URLs that are unsafe or associated with malware impacts the app risk assessment. In particular, apps that have been observed to download additional (e.g., malicious) content from URLs associated with malware impacts the app risk assessment.

As another example, the platform can apply its own URL "blacklists" or integrate with third party URL blacklist feed providers.

As another example, whether the app accesses SMS numbers that are unsafe or associated with malware impacts the app risk assessment. In particular, a common malware technique is to subscribe a user to an SMS service that will try to steal user data (e.g., phishing attacks).

As another example, whether the app access SMS numbers that are associated with premium (paid) services impacts the app risk assessment. In particular, a common malware technique is to subscribe a user to a premium SMS service, hiding the actual messages from the user but accruing charges (e.g., certain mal-behaving apps can attempt to generate a monetary return for the app developer by sending unauthorized SMS messages, such as using known bad SMS numbers).

As another example, whether the app performs unrequested behaviors (e.g., a mass text to a whole address book, a mass email to a whole address book, an audio or video recording) impacts the app risk assessment.

As another example, what permissions does the app request can be analyzed to determine whether such behavior impacts the app risk assessment (e.g., how do these compare to the average permission count). In particular, malware authors usually take advantage of the difficult to interpret permissions and hide risky behaviors among benign ones to sneak past the user's review process.

As another example, the source of the app (e.g., which market did the app come from) can be analyzed to determine whether such impacts the app risk assessment. In particular, some app markets (e.g., app markets in China and Russia) are known to include higher amounts of malware.

As another example, the developer of the app (e.g., which developer developed the app) can be analyzed to determine whether such impacts the app risk assessment. In particular, some app developers are known for delivering malware or risky apps in the past while others have better reputations.

As another example, the available market data of the app (e.g., app rating, number of downloads, developer's reputation) can be analyzed to determine whether such impacts the app risk assessment.

As another example, whether the app transmits information in clear-text (e.g., without encryption) can be analyzed to determine whether such impacts the app risk assessment.

As another example, whether the app uses encryption for all of its external communication can be analyzed to determine whether such impacts the app risk assessment. In particular, what type of encryption is used and whether the encryption was implemented correctly can be used for such app risk assessment.

As another example, whether the app transmits account user name information (e.g., with or without user permission, and with or without encryption) can be analyzed to determine whether such impacts the app risk assessment.

As another example, whether the app transmits account password information (e.g., with or without user permission, and with or without encryption) can be analyzed to determine whether such impacts the app risk assessment.

As another example, whether the app locally stores account user name information (e.g., with or without user permission, and with or without encryption) can be analyzed to determine whether such impacts the app risk assessment.

As another example, whether the app locally stores account password information (e.g., with or without user permission, and with or without encryption) can be analyzed to determine whether such impacts the app risk assessment.

As another example, whether the app tracks location information (e.g., with or without user permission, and with or without encryption) can be analyzed to determine whether such impacts the app risk assessment. In particular, if the app tracks location information, how does the app track the location (e.g., does the app location track using GPS, using cell tower triangulation, using GeoIP such as using official APIs or using unofficial APIs).

As another example, whether the app attempts to uniquely identify the user of the mobile device can be analyzed to determine whether such impacts the app risk assessment.

As another example, whether the app shares address book or contact information (e.g., with or without user permission, and with or without encryption) can be analyzed to determine whether such impacts the app risk assessment.

As another example, whether the app includes voice recording capabilities/functions can be analyzed to determine whether such impacts the app risk assessment.

As another example, whether the app includes picture and/or video recording capabilities/functions can be analyzed to determine whether such impacts the app risk assessment.

As another example, whether the app reads/writes to removable storage (e.g., a compact flash card or other types of removable storage) can be analyzed to determine whether such impacts the app risk assessment.

As another example, whether the app performs good behavior(s) (e.g., adding secondary Digital Rights Management (DRM) to protect the app and/or added Virtual Private Network (VPN) support for secure communications) can be analyzed to determine whether such impacts the app risk assessment, in which such good behaviors can be used to improve the scoring of the app's risk assessment.

As another example, an app can be blacklisted (e.g., by the platform and/or by a particular enterprise/customer that can identify apps to be blacklisted so that such are not available in the enterprise app store). For example, if a particular app is blacklisted, such as Dropbox (e.g., or another app), then the platform can block any apps that match Dropbox. Also, the platform can also be configured to dynamically extend this rule for blocking Dropbox to also block any apps that use Dropbox based on static analysis, dynamic analysis, and/or other behavior-based analysis and monitoring (e.g., determining which apps use or incorporate the Dropbox SDK, apps that include calls to URLs to Dropbox, etc.).

In some embodiments, an app risk assessment report is generated based on the risk assessment for an analyzed app, such as using the phase-based analysis discussed above. In some embodiments, the app risk assessment report includes various risks and weights per app. In some embodiments, the app risk assessment report can be customized for an enterprise, such as based on an enterprise's custom app risk profile and/or enterprise's custom report profile. For example, a particular enterprise, such as a Fortune 500 company can configure a custom app risk profile that grey lists an app if an iOS app does not use standard Apple terms and conditions (e.g., so that inside legal counsel for a Fortune 500 company can be notified of such app to review their custom terms and conditions to determine whether such are acceptable for use by their employees based on those unique terms and conditions).

Figure 3:
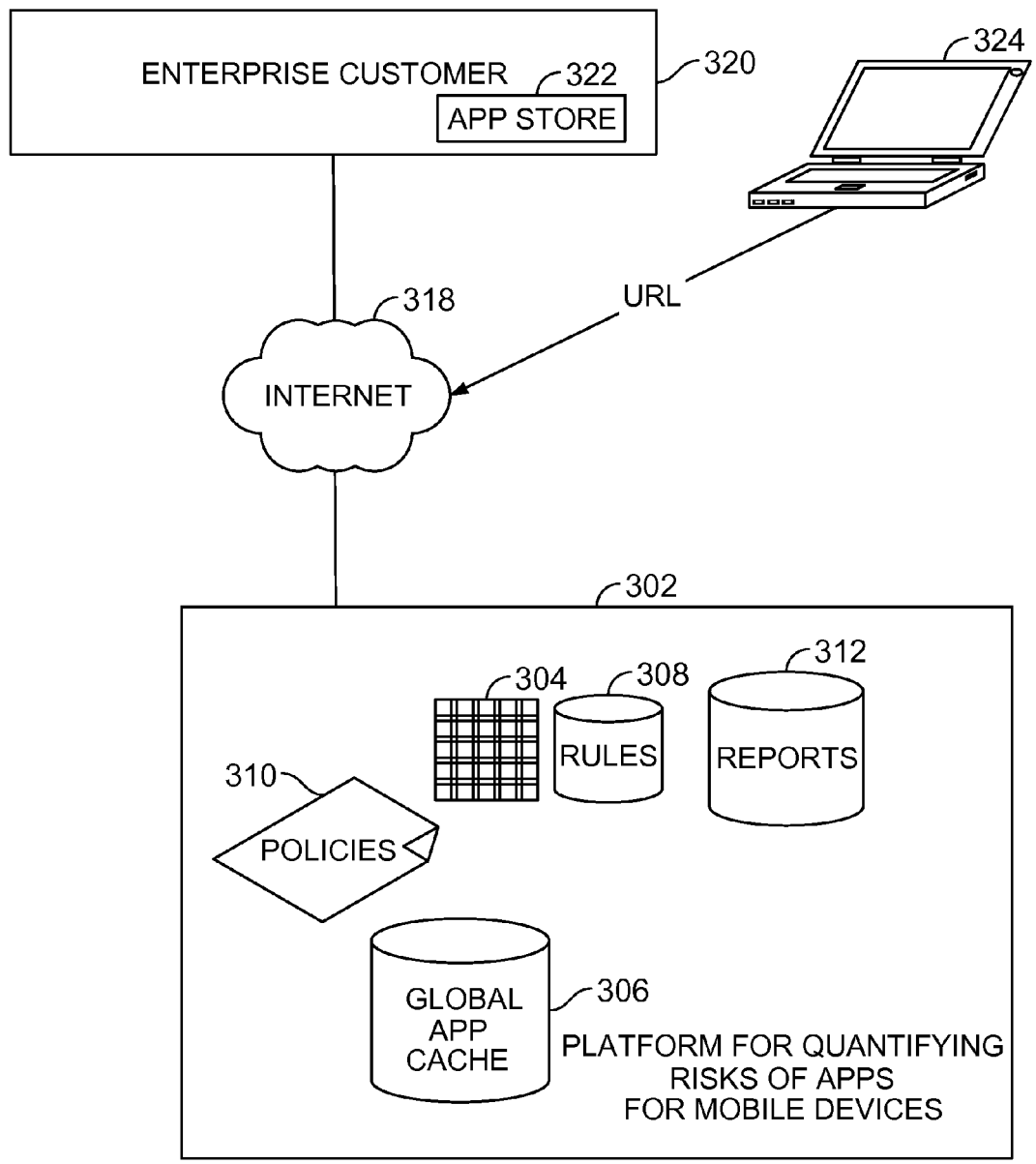
FIG. 3 is another functional block diagram of an architecture for quantifying the risks of apps for mobile devices in accordance with some embodiments.

FIG. 3 is another functional block diagram of an architecture for quantifying the risks of apps for mobile devices in accordance with some embodiments. As shown, a cloud-based platform for quantifying the risks of apps for mobile devices 302 is provided. The platform 302 includes one or more processors 304. In some embodiments, the platform is implemented as a plurality of servers, appliances, virtual machines, and/or combinations thereof. In some embodiments, the platform performs the functions as described above with respect to FIGS. 1 and 2.

As also shown, the platform 302 includes a global app cache 306 for storing previously analyzed apps. The platform 302 also includes policies 310. For example, policies 310 can include various policies for scanning apps for risk assessment (e.g., security policies, privacy policies, device/network integrity policies, etc.). The policies 310 can also include enterprise specific or custom policies, such as custom policies for an enterprise customer 320 (e.g., ACME Corporation), which has an enterprise app store 322 and is in communication with the platform 302 via the Internet 318 as shown. In particular, an authorized user of the enterprise customer (e.g., a corporate IT security admin of ACME Corporation) can access the platform 302 using a device 324 via the Internet 318 (e.g., by securely logging in through a web site, accessed via a URL, such as shown). For example, the authorized user (e.g., a corporate IT team member of ACME Corporation) can configure custom policies, request reports (e.g., individual app reports, bulk app reports, etc.), and/or manage their enterprise account. As also shown, the platform 302 includes various rules 308 for performing various analysis on apps, such as described above with respect to FIG. 2. For example, rules 308 can include various rules (e.g., data and/or executable instructions) that can be processed by the various engines, such as shown in FIG. 1, and applied to perform various app analysis based on an app risk profile, such as implementing the various phases discussed above with respect to FIG. 2.

As also shown, the platform 302 includes a reports data store 312 (e.g., database) for storing reports generated by the platform based on analysis of apps for various users or customers, such as enterprise customer 320. For example, various reports based on apps analysis for ACME Corporation's enterprise app store 322 can be stored in the reports data store. Various reports based on app analysis for other customers or users can also be stored in the reports data store.

Figure 4:
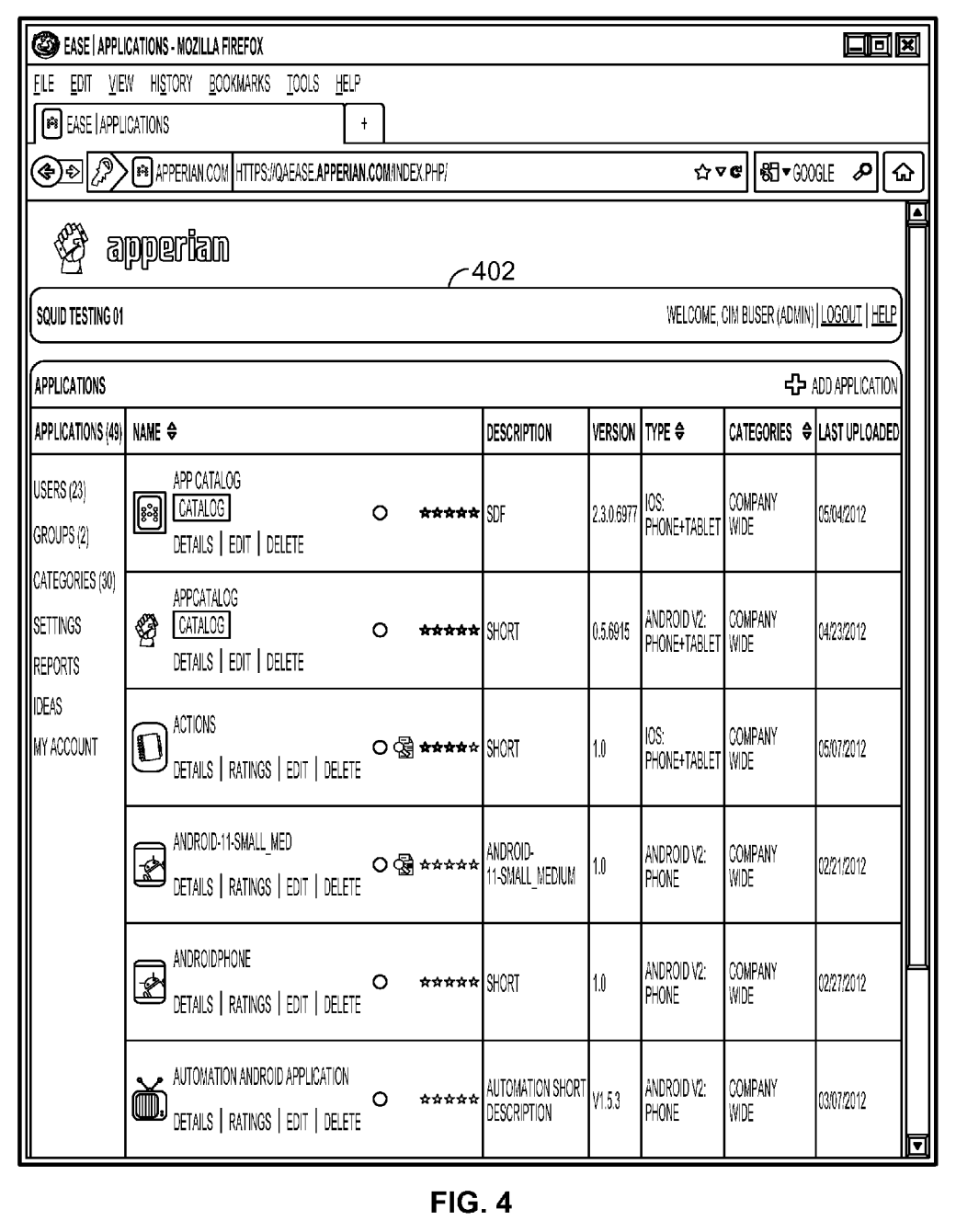

FIG. 4 is a screen diagram of an apps view of a user interface for a platform for quantifying risks of apps for mobile devices in accordance with some embodiments. As shown, the apps view 402 lists various apps that have been analyzed including indicating a star rating for each of the apps, a description of each of the apps, a version of each of the apps, a type for each of the apps, categories for each of the apps, and a date/time for a last upload (e.g., time stamp for when the app was last uploaded to the platform for analysis). As also shown, there are various selectable actions under each, such as Details, Ratings, Edit, and Delete. As also shown, the user interface for the platform includes different views, such as for applications (e.g., as shown in 402, users, groups, categories, settings, reports, Ideas, and My Account).

Figure 5:
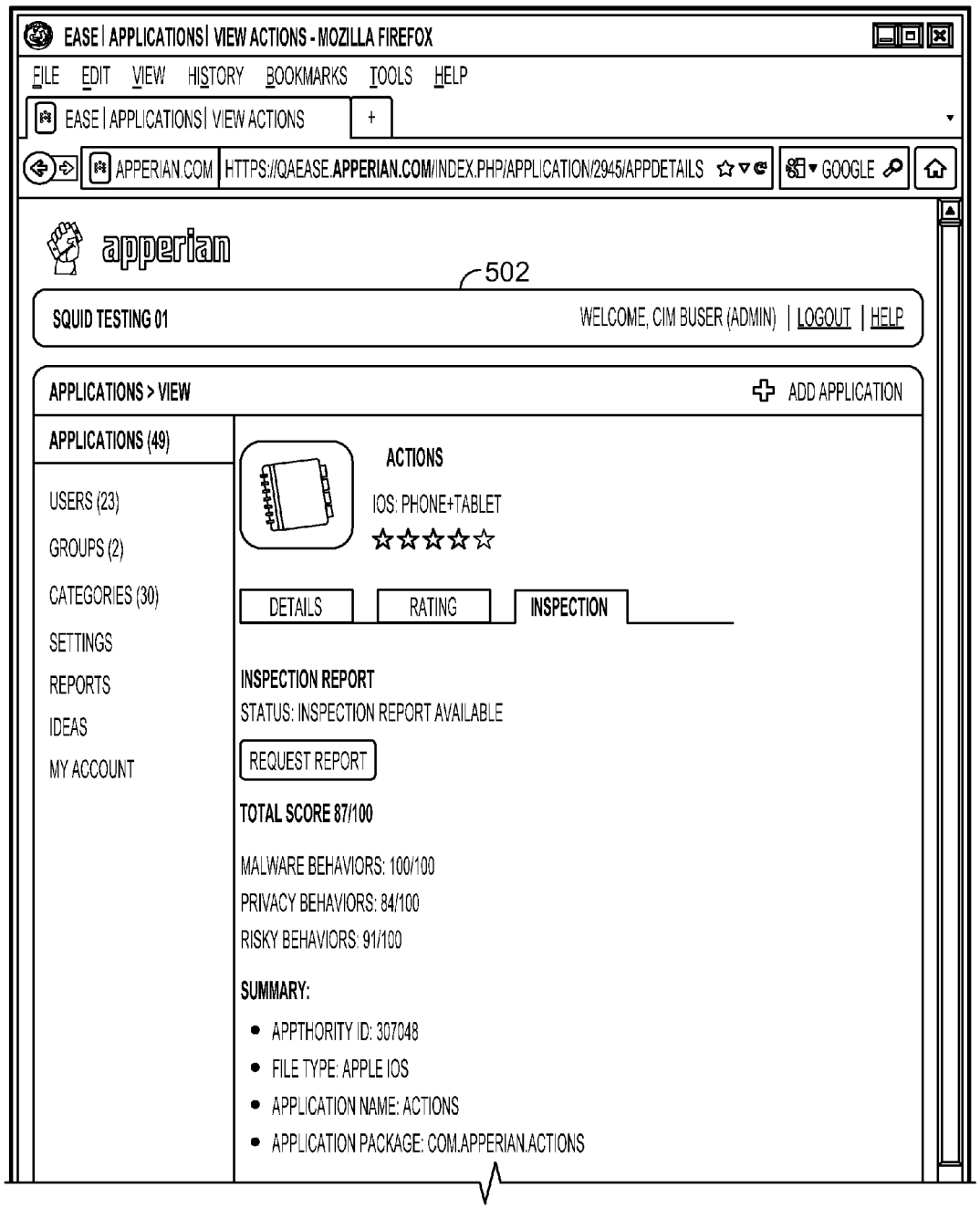
FIG. 5 is a screen diagram of a detailed report for an app analyzed by the platform for quantifying the risks of apps for mobile devices in accordance with some embodiments.

FIG. 5 is a screen diagram of a detailed report for an app analyzed by the platform for quantifying the risks of apps for mobile devices in accordance with some embodiments. In some embodiments, the detailed report 502 is generated by the platform for quantifying risks of apps for mobile devices and can be accessed using a web browser. As shown, the detailed report 502 provides the output of a report generated for an "Actions" app for an iOS phone/tablet, which has been analyzed by the platform and includes a star rating for the app (e.g., 4 stars as shown), with selectable tabs that include Details, Rating, and Inspection. As shown, the Inspection tab is selected and shows the details of the Inspection Report (e.g., reporting a total score of 87/100, including detailed scores for malware behaviors of 100/100, privacy behaviors of 84/100, and risky behaviors of 91/100. As also shown, a summary section is provided, a risky behaviors section is provided, a privacy behaviors section is provided, and a hostname and IP addresses section are provided (e.g., listing reputation information for hostnames and IP addresses that are visited/associated with this app). As would be apparent to one of ordinary skill in the art in view of the various embodiments described herein, various other details and report format and details/information can be provided based on the analysis performed by the platform for quantifying risks of apps for mobile devices as described herein, including based on various user defined customizations (e.g., enterprise customized reporting).

Figure 6:
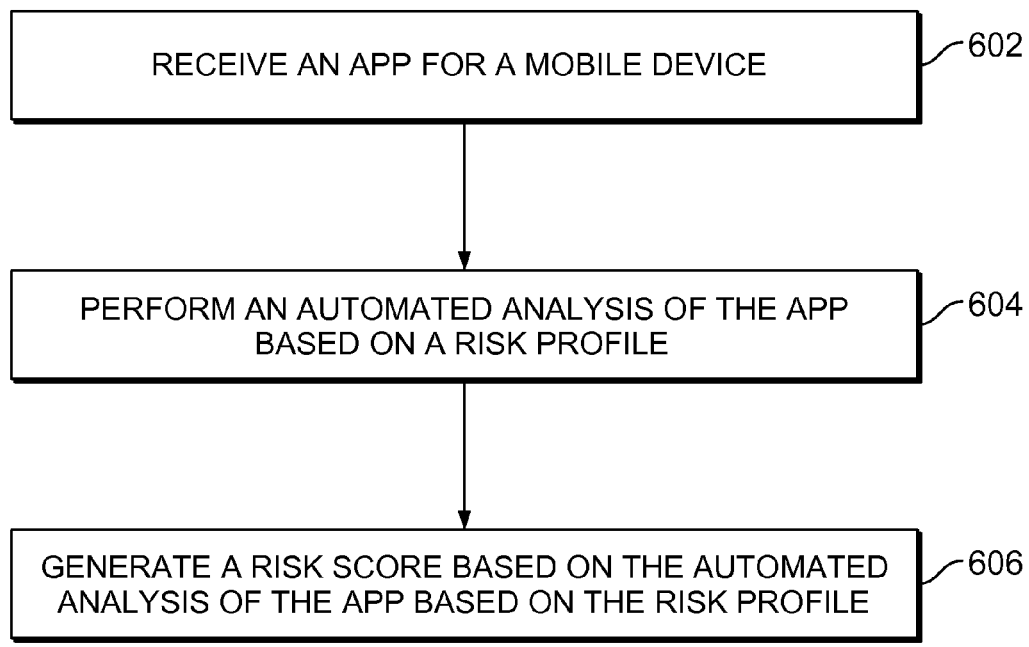
FIG. 6 is a flow diagram for quantifying the risks of apps for mobile devices in accordance with some embodiments.

FIG. 6 is a flow diagram for quantifying the risks of apps for mobile devices in accordance with some embodiments. At 602, an application for a mobile device is received. At 604, an automated analysis of the application based on a risk profile (e.g., using a cloud-based app risk assessment platform/service) is performed. At 606, generating a risk score based on the automated analysis of the application based on the risk profile is performed.

Figure 7:
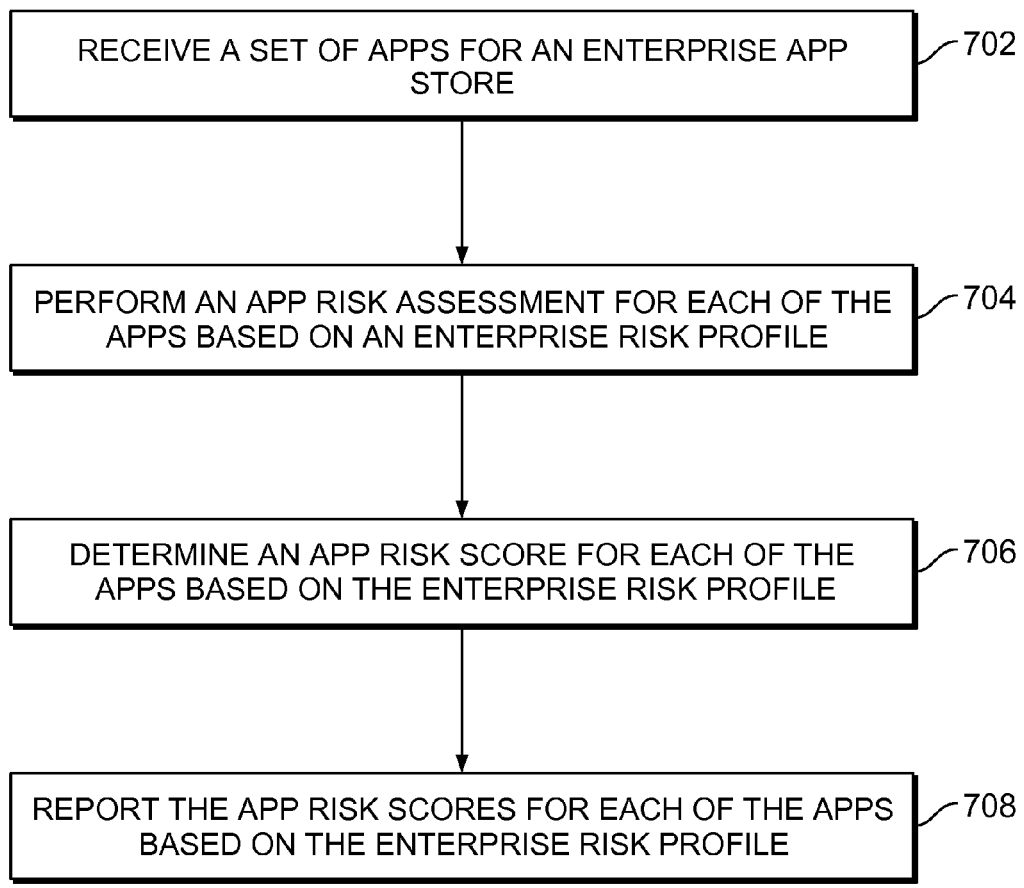
FIG. 7 is another flow diagram for quantifying the risks of apps for mobile devices in accordance with some embodiments.

FIG. 7 is another flow diagram for quantifying the risks of apps for mobile devices in accordance with some embodiments. At 702, a set of apps for an enterprise app store are received. At 704, an automated analysis of each of the apps (e.g., of the set of apps) based on an enterprise risk profile is performed. At 706, determining an app risk score for each of the apps (e.g., of the set of apps) based on the enterprise risk profile is performed. At 708, reporting the app risk scores for each of the apps (e.g., of the set of apps) based on the enterprise risk profile is performed.

For example, using the various techniques described herein, quantifying the risks of apps for mobile devices can be provided by leveraging various mobile application management (MAM) solutions (e.g., enterprise app stores). In particular, MAM solutions, also called "enterprise app stores" store app metadata as well. For example, an enterprise app store (e.g., enterprise app store 118 as shown in FIG. 1) can include or be implemented using a commercially available MAM solution. Example commercially available MAM products in the market today include those sold by Apperian, AppCentral, and other commercial vendors. The typical enterprise app store today has approximately 10 to 50 or more apps inside of it. For example, these apps can be "in-house apps," which are enterprise line of business (LOB) applications for performing a specific task or apps for which the enterprise wants all employees to have access to for installing on their mobile devices (e.g., a sales related app for its sales personnel, and/or other types of apps for all or particular categories of users). In some embodiments, the platform for quantifying the risks of apps for mobile devices similarly supports receiving such store app metadata (e.g., using a bulk query) to identify which apps in the enterprise app store violate a policy (e.g., a malware policy, an enterprise policy, and/or another mobile app policy) using similar techniques as described herein with respect to various embodiments.

In some embodiments, the off-device anti-malware protection for mobile devices further includes using an off-device anti-malware scanner for assessing risks for apps (e.g., for a plurality of different mobile device platforms based on an anti-malware policy). For example, the off-device anti-malware protection for mobile devices can use the platform described above with respect to FIGS. 1-7 to provide an off-device anti-malware scanner for assessing risks for apps.

Figure 8:
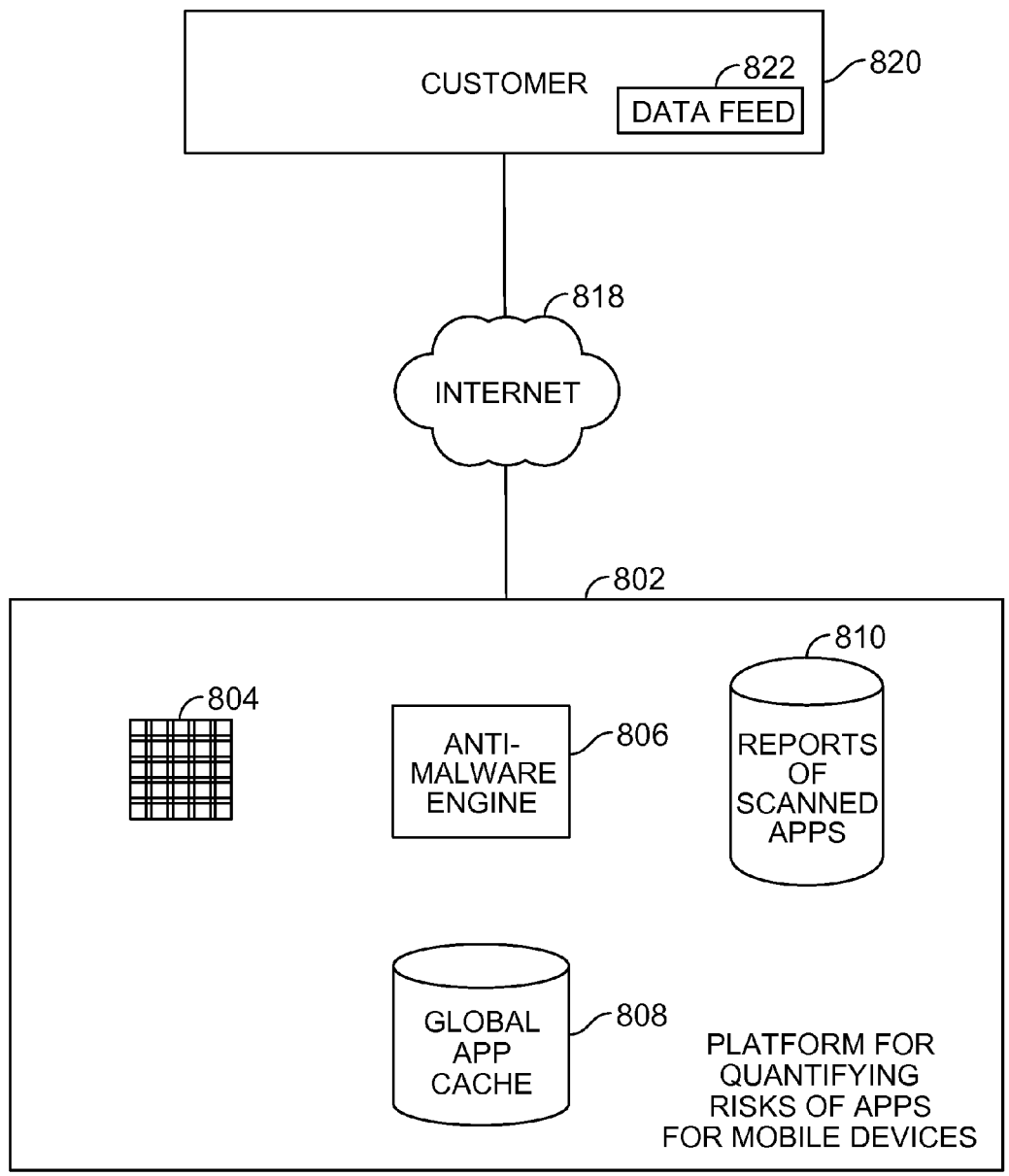
FIG. 8 is a functional block diagram of an architecture for off-device anti-malware protection for mobile devices that includes a platform for quantifying risks of apps for mobile devices in accordance with some embodiments.

FIG. 8 is a functional block diagram of an architecture for off-device anti-malware protection for mobile devices that includes a platform for quantifying risks of apps for mobile devices in accordance with some embodiments. As shown, a cloud-based platform for quantifying the risks of apps for mobile devices 802 is provided. The platform 802 includes one or more processors 804. In some embodiments, the platform is implemented as a plurality of servers, appliances, virtual machines, and/or combinations thereof. In some embodiments, the platform 802 performs anti-malware analysis using an anti-malware engine 806, such as scanning for viruses, vulnerabilities, and/or other potential malware threats using various signature-based, heuristic-based, and/or behavior-based techniques. For example, the platform can analyze "finished apps" (e.g., finished apps typically include binaries, object code, decompiled source code, metadata, etc.). The anti-malware engine 806 is used to scan apps that are newly uploaded into the global app cache 808. For example, app stores (e.g., public and/or private) can be scanned periodically for new apps or new versions of apps and can be uploaded (e.g., based on a threshold of popularity of such apps) to queue for scanning by the platform. The results of each app scanned are stored in the data store for scanned apps results 810 (e.g., database). As also shown, the reports of scanned apps can be communicated via the Internet 818 to customers as a data feed delivered by the platform, such as a data feed 822 that is received and stored by, for example, a customer 820. For example, the data feed can be provided as a subscription service (e.g., for apps for certain and/or all monitored mobile device platforms).

In some embodiments, a data feed (e.g., similar to the data feed 822) is generated using a platform for quantifying risks of apps for mobile devices, such as the platform described in detail above with respect to FIGS. 1-7.

Figure 9:
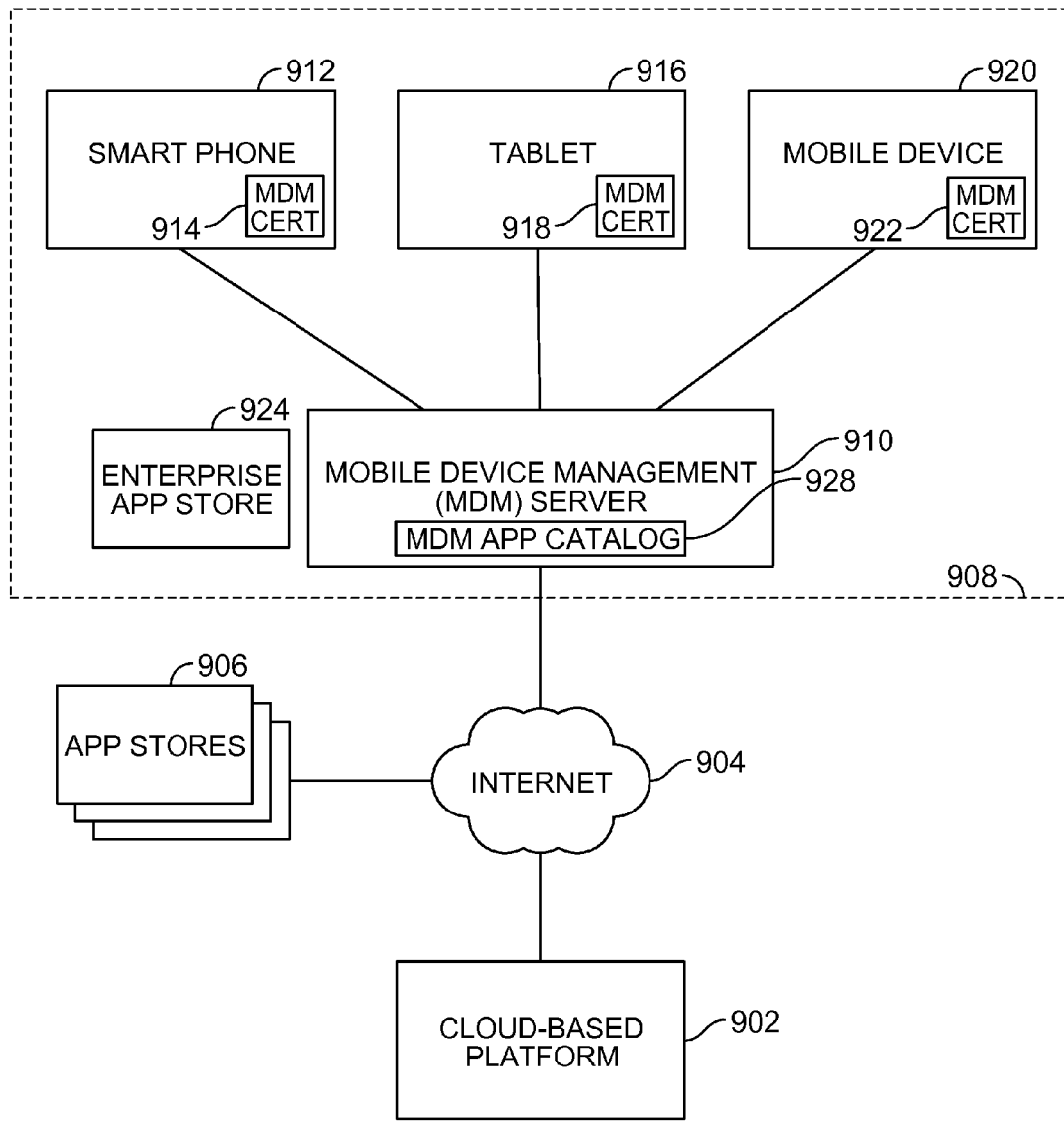
FIG. 9 is a functional block diagram of an architecture for off-device anti-malware protection for mobile devices that includes a cloud-based platform in communication with a mobile device management (MDM) service in accordance with some embodiments.

FIG. 9 is a functional block diagram of an architecture for off-device anti-malware protection for mobile devices that includes a cloud-based platform in communication with a mobile device management (MDM) service in accordance with some embodiments. As shown, a cloud-based platform 902 is provided for performing anti-malware analysis on apps for mobile devices, such as using the techniques described herein. The platform 902 is in communication with multiple app stores 906 via the Internet 904. The platform 902 is also in communication with various enterprise customers, such as shown with enterprise customer 908. For example, the platform can analyze "finished apps" (e.g., finished apps typically include binaries, object code, decompiled source code, metadata, etc.).

As also shown, enterprise customer 908 has a mobile device management (MDM) server 910 (e.g., an MDM service provided, for example, using an MDM server/appliance) for managing their user's mobile devices (e.g., a fleet of managed mobile devices for the enterprise), such as a smart phone 912, a tablet 916, and another type of mobile device 920. Various commercial MDM services exist and can be used for such an MDM service, such as BoxTone, Good Technology, Mobile Iron, Zenprise, and/or other vendors that provide commercially available solutions for such MDM services.

In some embodiments, a Mobile Device Management (MDM) provisioning certificate is installed on each mobile device. As shown, smart phone 912 includes an MDM certificate 914, tablet 916 includes an MDM certificate 918, and mobile device 920 includes an MDM certificate 922. For example, the MDM certificate can be used to allow the device to report to the MDM server 910 which apps are installed on the mobile device, which can then be used to generate the app inventory for the mobile device. In some embodiments, an Enterprise Mobility Management (EMM) service (e.g., using an EMM server/appliance) is used to manage the mobile devices and to facilitate the various techniques for providing off-device anti-malware protection for an enterprise's fleet of managed mobile devices as similarly described herein with respect to the MDM service. For example, each managed mobile device can sync (e.g., periodically) with the MDM App Catalog or App Library 928, and the MDM service can store the mobile app metadata in the MDM App Catalog 928 for each managed mobile device.

In some embodiments, the app inventory for each mobile device managed by the MDM service can be communicated to the cloud-based platform 902 (e.g., using a secure communication interface, such as the Rest API described above). The cloud-based platform can analyze this app inventory to identify which of such apps in the app inventory violate an app risk profile (e.g., malware, privacy, and/or other criteria) or enterprise specific app risk profile. In particular, the cloud-based platform can correlate the app metadata against an existing collection of scanned apps, to find the matching results for each app identified in the app inventory, and can send back the results (e.g., whether the app is determined to be associated with malware or not) to the MDM App Catalog 928.

For example, the cloud-based platform 902 can perform automated scanning of a plurality of applications ("apps") for a plurality of different mobile device platforms (e.g., operating system platforms, such as Apple iOS®, Google Android®, and Microsoft Windows®) based on a policy (e.g., a malware policy). For example, the platform can also continually monitor various public app stores 906 to identify new apps and/or new versions of apps to upload and scan. The platform 902 can cache the results for scanned apps (e.g., based on a policy, such as a malware policy). Accordingly, platform 902 can use the platform's scanned app cache results to efficiently compare an app inventory received from MDM server 910 for a particular mobile device (e.g., mobile device 920) with the previously cached results for scanned apps to determine whether any of the apps identified in the app inventory are deemed risky (e.g., violate an aspect of a policy, such as a malware policy). If an app identified in the app inventory does not match any previously scanned apps, then the platform 902 can upload a copy of that app (e.g., from a public app store 906, a private/enterprise app store 924, or the mobile device 920) and scan that app to determine whether the app is in compliance with a malware policy. Similarly, if an app identified in the app inventory has not been previously scanned based on a particular enterprise customized policy for the enterprise customer 908, then the platform 902 can upload a copy of that app (e.g., from a public app store 906, a private/enterprise app store 924, or the mobile device 920) and scan that app to determine whether the app is in compliance with that particular enterprise customized policy for the enterprise customer 908.

In some embodiments, an enterprise enforces this off-device anti-malware for mobile devices solution by requiring that whenever a mobile device of a user (e.g., employee of the enterprise) attempts to access an enterprise IT resource (e.g., Wi-Fi network, corporate network, email, etc.), the employee will then be required to download an MDM certificate prior to gaining access to such enterprise IT resources. For example, an enterprise such as ACME Corporation can install an MDM server such that when Bob, who is an employee of ACME Corporation, purchases a new mobile device, such as a new Apple iPhone®, then the MDM server can be used to provision the new mobile device. In particular, when Bob attempts to connect his new Apple iPhone® to the corporate Wi-Fi network at his corporate office at ACME Corporation, then Bob can be required to click accept when prompted to download the MDM provisioning profile (e.g., an MDM certificate) to his new Apple iPhone® (e.g., or such downloading and installing of the MDM certificate can happen automatically as part of the provisioning of the ACME corporate Wi-Fi setup/connection). Once the new MDM certificate is installed on Bob's new Apple iPhone®, then the MDM certificate is used to automatically report an app inventory of Bob's new iPhone to the MDM server for ACME Corporation. The MDM server then reports (e.g., periodically, based on an event(s), or based on other configuration settings or a profile, etc.) the app inventory for Bob's new Apple iPhone® to a cloud service (e.g., cloud-based platform 902) for analyzing the app inventory to determine which if any of the apps in the app inventory violate a risk profile (e.g., a default malware/risk profile or a risk profile customized for the enterprise—ACME Corporation). In some embodiments, the cloud service includes the platform for quantifying app risks for mobile devices as discussed above with respect to FIGS. 1-7. In some embodiments, the cloud service includes the platform for quantifying app risks for mobile devices as discussed above with respect to FIG. 8. In some embodiments, apps that are determined to violate an app risk policy (e.g., a general anti-malware app risk policy, and/or an enterprise configured app risk profile customized by corporate IT for ACME Corporation) can be reported to corporate IT for the enterprise (e.g., corporate IT for ACME Corporation). In some embodiments, apps that are determined to violate a risk profile can be uninstalled/removed from the mobile device, quarantined or removed from the enterprise app store, and/or other actions performed. For example, if Bob's mobile device is determined to have an app called Online Gambling that violates the enterprise app risk profile, then using these techniques the Online Gambling app can be selectively wiped from Bob's mobile device to automatically remediate for compliance based on the app risk policy for ACME Corporation. As another example, if Bob's mobile device includes a version of a Sales Management app that has been updated to fix a known security vulnerability, then the updated version of that Sales Management app can be pushed to and installed on Bob's mobile device (e.g., to facilitate automated, rapid, and dynamic app updates for mobile devices). In some embodiments, apps that are determined to violate a risk profile can be enforced based on an enforcement policy (e.g., a risk profile, which can be specific to the enterprise, specific to user group(s), user(s), location(s), etc.). For example, if Bob is an executive or a member of finance, then Bob may be subject to a different risk profile than another employee who does not have access to highly sensitive or confidential corporate or financial information of the enterprise—ACME Corporation.

In some embodiments, the MDM provisioning profile periodically syncs the app inventory for each managed mobile device with the MDM server 910. This information can be used to also periodically check the updated app inventory for each mobile device associated with users of ACME Corporation to check if such apps satisfy the enterprise app risk profile for ACME Corporation, and appropriate reporting and/or enforcement policies can be implemented based on such analysis.

In some embodiments, the platform 902 determines whether or not apps are acceptable for the enterprise's mobile device policy. For example, the apps in question may not be considered malware or malicious universally (e.g., not all companies desire to block them, such as a Dropbox® app or other types of apps) but may be labeled as "dangerous" or "non-compliant" on a case-by-case basis depending on the criteria or requirements for particular enterprises, which can define customized enterprise policies as described herein. For example, behaviors and/or attributes that such a policy can look for include the following: whether the app tracks a user's location (e.g., an enterprise may choose to prevent executives or sales persons from using apps with such attributes); whether the app exports the user's contact information; whether the app shares username and/or password information; whether the app uses proper encryption (e.g., client-side encryption for cloud-based storage services, network-based encryption for secure communications, etc.); whether the app uses excessive data usage/network usage (e.g., based on monitored testing as compared with other apps, such as comparable categories of apps); whether the app uses excessive power usage (e.g., based on monitored testing as compared with other apps, such as comparable categories of apps); and/or various other behaviors and/or attributes.

In some embodiments, the MDM server 910 can then be used to implement enforcement capabilities and enterprise policy. For example, the MDM server 910 can be configured to quarantine the mobile devices that are determined to be infected with malware (e.g., have apps installed to be known to include malware). In some embodiments, the MDM server 910 applies the results to restrict the app from being installed in other mobile devices in the enterprise. For example, the MDM server 910 can also remove or disallow such known bad apps (e.g., apps that violate a malware policy and/or an enterprise malware policy) from being available in the enterprise app store 924.

Accordingly, this approach provides an off-device and OS-independent solution (e.g., not specific or limited to supporting only certain mobile device OS platforms). Also, this approach provides an industry-first solution for iOS® supported "off-device" anti-malware support due to the app metadata being sent from the MDM app catalog to the platform 902, as discussed above (e.g., an app inventory cannot be generated using an "on-device" approach for iOS® based devices). In some embodiments, app metadata is communicated in bulk (e.g., hundreds to thousands of apps across a fleet of devices managed for an enterprise can be checked, such as using the bulk query API as discussed above) or sent individually using real-time event-based triggers and/or other configuration parameters or criteria.

In some embodiments, off-device anti-malware protection for mobile devices includes receiving store app metadata to verify whether apps in the enterprise app store comply with a policy (e.g., a malware policy, an enterprise policy, and/or another mobile app policy). For example, using the various techniques described herein, cloud-based malware detection can be provided by leveraging various mobile application management (MAM) solutions (e.g., enterprise app stores). In particular, MAM solutions, also called "enterprise app stores," store app metadata as well. For example, enterprise app store 924 can include or be implemented using a MAM solution. The typical enterprise app store today has approximately 10 to 50 or more apps inside of it. For example, these apps can be "in-house apps," which are enterprise line of business (LOB) applications for performing a specific task or apps for which the enterprise wants all employees to have access to for installing on their mobile devices (e.g., a sales related app for its sales personnel, and/or other types of apps for all or particular categories of users). Example commercially available MAM products in the market today include those sold by Apperian, AppCentral, and other commercial vendors. In some embodiments, the cloud-based platform similarly supports receiving such store app metadata (e.g., using a bulk query, such as described above) to identify which apps in the enterprise app store (e.g., enterprise app store 924) violate a policy (e.g., a malware policy, an enterprise policy, and/or another mobile app policy) using similar techniques as described herein with respect to various embodiments.

In some embodiments, off-device anti-malware protection for mobile devices includes receiving one or more apps prior to the containerization or sandboxing process to verify whether such apps comply with a policy (e.g., a malware policy, an enterprise policy, and/or another mobile app policy). For example, using the various techniques described herein, cloud-based malware detection of apps prior to the containerization or sandboxing process can be provided. In particular, various solutions have recently emerged to make arbitrary apps "enterprise managed." Commercially available products for such solutions to make arbitrary apps "enterprise managed" are available from Mocana, AppCentral, and other commercial vendors. In particular, these providers can containerize or sandbox existing apps, by repackaging them with modifications (e.g., binary patching, changed metadata, etc.). For example, enterprise app store 924 can include one or more such "enterprise managed" apps. In some embodiments, prior to the containerization or sandboxing process for "enterprise managed" apps, the cloud-based platform 902 is used for performing an automated analysis of the apps for malware or other policy-based evaluations/compliance requirements. For example, a customer can upload the app (e.g., before containerization, after containerization, or both) to the cloud-based platform (e.g., using the Rest API), and the platform can respond with the results of the analysis of the app or perform other actions as similarly described herein with respect to various embodiments.

Figure 10:
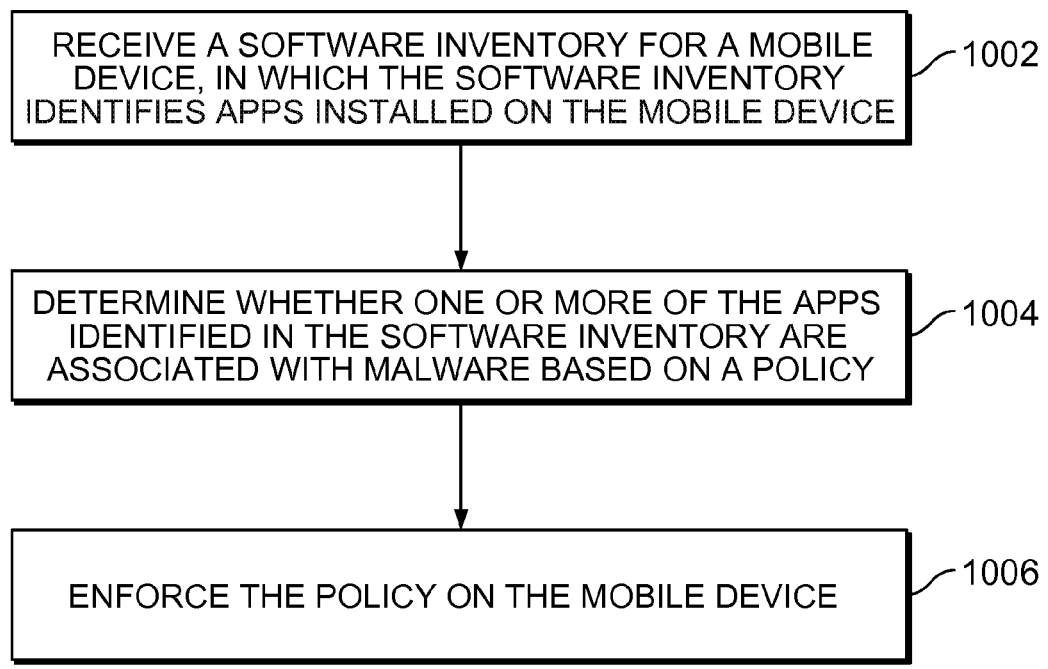
FIG. 10 is a flow diagram illustrating off-device anti-malware protection for mobile devices in accordance with some embodiments.

FIG. 10 is a flow diagram illustrating off-device anti-malware protection for mobile devices in accordance with some embodiments. At 1002, a software inventory for a mobile device is received, in which the software inventory identifies apps installed on the mobile device. At 1004, determining whether one or more of the apps identified in the software inventory are associated with malware based on a policy (e.g., using an off-device anti-malware service/platform) is performed. At 1006, enforcing the policy on the mobile device is performed.

Figure 11:
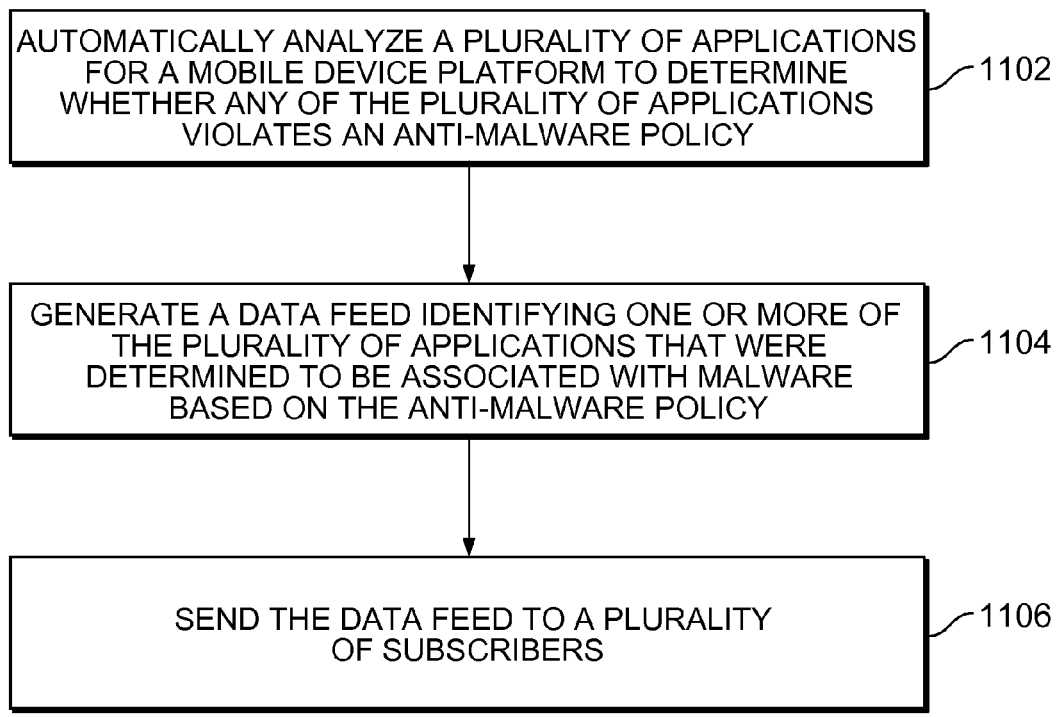
FIG. 11 is another flow diagram illustrating off-device anti-malware protection for mobile devices in accordance with some embodiments.

FIG. 11 is another flow diagram illustrating off-device anti-malware protection for mobile devices in accordance with some embodiments. At 1102, automatically analyzing a plurality of applications for a mobile device platform is performed to determine whether any of the plurality of applications violates an anti-malware policy. At 1104, generating a data feed identifying one or more of the plurality of applications that were determined to be associated with malware based on the anti-malware policy is performed. At 1106, sending the data feed to a plurality of subscribers is performed. In some embodiments, the data feed is provided to an enterprise for enforcing the anti-malware policy on mobile devices used to access data resources in the enterprise, in which the policy includes one or more of the following: a malware policy, a privacy policy, and an enterprise configured application security policy. In some embodiments, the data feed is provided to a mobile device management (MDM) service for enforcing the anti-malware policy on a plurality of mobile devices managed by the MDM service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for off-device anti-malware protection for mobile devices, comprising:
a processor configured to:
receive a software inventory for a mobile device, wherein the software inventory identifies a plurality of applications installed on the mobile device; and
determine whether one or more of the plurality of applications identified in the software inventory are associated with malware based on an enterprise policy that includes custom rules for scanning of apps based on security requirements for scanning apps for risk assessment, wherein the enterprise policy includes a security policy for scanning apps for risk assessment, and wherein the determining of whether the one or more of the plurality of applications identified in the software inventory are associated with malware comprises to:
perform a static analysis on an app including to extract method and function names called by the app; and
perform a dynamic analysis on the extracted method and function names called by the app to determine whether a scope of authorization or a proper user permission is exceeded during execution; and
a memory coupled to the processor and configured to provide the processor with instructions.

2. The system recited in claim 1, wherein the software inventory for the mobile device is received at a cloud service for providing off-device anti-malware protection for mobile devices.

3. The system recited in claim 1, wherein the enterprise policy includes one or more of the following: a malware policy, a privacy policy, and an enterprise configured application security policy.

4. The system recited in claim 1, wherein a mobile device management (MDM) provisioning profile is installed on the mobile device, and wherein the MDM provisioning profile generates the software inventory for the mobile device.

5. The system recited in claim 1, wherein a mobile device management (MDM) provisioning profile is installed on the mobile device, wherein the MDM provisioning profile periodically generates an updated software inventory for the mobile device, and wherein the periodically updated software inventory for the mobile device is communicated to a cloud service for providing off-device anti-malware protection for mobile devices.

6. The system recited in claim 1, wherein a mobile device management (MDM) provisioning profile is installed on the mobile device, wherein the MDM provisioning profile periodically generates an updated software inventory for the mobile device, wherein the mobile device periodically synchronizes with a mobile device management (MDM) service to provide an updated software inventory for the mobile device, and wherein the periodically updated software inventory for the mobile device is communicated from the MDM service to a cloud service for providing off-device anti-malware protection for mobile devices.

7. The system recited in claim 1, wherein a certificate is installed on the mobile device, and wherein the certificate is used to generate the software inventory that is communicated to a service for providing off-device anti-malware protection for mobile devices.

8. The system recited in claim 1, wherein a mobile device management (MDM) provisioning profile is installed on the mobile device, wherein the MDM provisioning profile periodically generates an updated software inventory for the mobile device, and wherein the periodically updated software inventory for the mobile device is communicated to a cloud service to update mobile app meta data for the mobile device stored in an MDM catalog.

9. The system recited in claim 1, wherein the processor is further configured to:
enforce the enterprise policy on the mobile device.

10. The system recited in claim 1, wherein the processor is further configured to:
send results of determining whether one or more of the plurality of applications identified in the software inventory are associated with malware based on the enterprise policy to a mobile device management (MDM) service, wherein the MDM service enforces the enterprise policy by uninstalling one or more applications on the mobile device that were identified as being associated with malware based on the enterprise policy.

11. The system recited in claim 1, wherein the processor is further configured to:
determine an application is in violation of one or more aspects of the enterprise policy.

12. The system recited in claim 1, wherein the processor is further configured to:
determine an application is risky based on the enterprise policy.

13. The system recited in claim 1, wherein the processor is further configured to:
respond to a bulk app query for an enterprise app store from a mobile application management (MAM) service using an app cache, wherein the app cache includes risk scores for previously analyzed applications.

14. The system recited in claim 1, wherein the processor is further configured to:
respond to a query for an enterprise app store from a mobile device management (MDM) service, wherein the query is a customized script to query for a plurality of applications in the enterprise app store.

15. The system recited in claim 1, wherein the processor is further configured to:
for each app included in the software inventory for the mobile device, perform the following:
determine whether the app is stored in a global app cache by querying the app cache for a match based on a unique identifier of the app, wherein the global app cache includes risk scores for previously analyzed applications based on the enterprise policy; and
if the app is not stored in the global app cache, then upload the app from an app store to determine whether the app is associated with malware based on the enterprise policy, wherein risk score results for the first app are stored in the global app cache.

16. The system recited in claim 1, wherein the processor is further configured to:
periodically scan a public app store to select one or more new apps for uploading for analysis, wherein the one or more new apps selected for uploading are determined based on a popularity of the apps; and if the one or more new apps identified in the app inventory has not been previously scanned based on the enterprise policy, then automatically scan each of the one or more new apps to determine whether each of the one or more new apps is in compliance with the enterprise policy.

17. The system recited in claim 1, wherein the enterprise policy for one location is different from another enterprise policy for another location.

18. A method for off-device anti-malware protection for mobile devices, comprising:
   receiving a software inventory for a mobile device, wherein the software inventory identifies a plurality of applications installed on the mobile device; and
   determining whether one or more of the plurality of applications identified in the software inventory are associated with malware based on an enterprise policy that includes custom rules for scanning of apps based on security requirements for scanning apps for risk assessment, wherein the enterprise policy includes a security policy for scanning apps for risk assessment, and wherein the determining of whether the one or more of the plurality of applications identified in the software inventory are associated with malware comprises:
      performing a static analysis on an app including extracting method and function names called by the app; and
      performing a dynamic analysis on the extracted method and function names called by the app to determine whether a scope of authorization or a proper user permission is exceeded during execution.

19. The method of claim 18, further comprising:
enforcing the enterprise policy on the mobile device.

20. The method of claim 18, further comprising:
sending results of determining whether one or more of the plurality of applications identified in the software inventory are associated with malware based on the enterprise policy to a mobile device management (MDM) service, wherein the MDM service enforces the enterprise policy by uninstalling one or more applications on the mobile device that were identified as being associated with malware based on the enterprise policy.

21. The method of claim 18, further comprising:
determining an application is in violation of one or more aspects of the enterprise policy.

22. The method of claim 18, further comprising:
determining an application is risky based on the enterprise policy.

23. A computer program product for off-device anti-malware protection for mobile devices, the computer program product being embodied in a non-transitory computer readable storage medium and comprising computer instructions for:
   receiving a software inventory for a mobile device, wherein the software inventory identifies a plurality of applications installed on the mobile device; and
   determining whether one or more of the plurality of applications identified in the software inventory are associated with malware based on an enterprise policy that includes custom rules for scanning of apps based on security requirements for scanning apps for risk assessment, wherein the enterprise policy includes a security policy for scanning apps for risk assessment, and wherein the determining of whether the one or more of the plurality of applications identified in the software inventory are associated with malware comprises:
      performing a static analysis on an app including extracting method and function names called by the app; and
      performing a dynamic analysis on the extracted method and function names called by the app to determine whether a scope of authorization or a proper user permission is exceeded during execution.

24. The computer program product recited in claim 23, further comprising computer instructions for:
enforcing the enterprise policy on the mobile device.

25. The computer program product recited in claim 23, further comprising computer instructions for:
sending results of determining whether one or more of the plurality of applications identified in the software inventory are associated with malware based on the enterprise policy to a mobile device management (MDM) service, wherein the MDM service enforces the enterprise policy by uninstalling one or more applications on the mobile device that were identified as being associated with malware based on the enterprise policy.

26. The computer program product recited in claim 23, further comprising computer instructions for:
determining an application is in violation of one or more aspects of the enterprise policy.

27. The computer program product recited in claim 23, further comprising computer instructions for:
determining an application is risky based on the enterprise policy.

28. A system for off-device anti-malware protection for mobile devices, comprising:
   a processor configured to:
      automatically analyze a plurality of applications for a mobile device platform to determine whether any of the plurality of applications violates an enterprise policy that includes custom rules for scanning of apps based on security requirements; and
      generate a data feed identifying one or more of the plurality of applications that were determined to be associated with malware based on the enterprise policy for scanning apps for risk assessment, wherein the enterprise policy includes a security policy for scanning apps for risk assessment, and wherein the determining of whether the one or more of the plurality of applications identified in the software inventory are associated with malware comprises to:
      perform a static analysis on an app including to extract method and function names called by the app; and
      perform a dynamic analysis on the extracted method and function names called by the app to determine whether a scope of authorization or a proper user permission is exceeded during execution; and
   a memory coupled to the processor and configured to provide the processor with instructions.

29. The system recited in claim 28, wherein the data feed is provided to an enterprise for enforcing the anti-malware policy on mobile devices used to access data resources in the enterprise, and wherein the enterprise policy includes one or more of the following: a malware policy, a privacy policy, and an enterprise configured application security policy.

30. The system recited in claim 28, wherein the data feed is provided to a mobile device management (MDM) service for enforcing the enterprise policy on a plurality of mobile devices managed by the MDM service.

31. The system recited in claim 28, wherein the processor is further configured to:
send the data feed to an enterprise subscriber for enforcing the enterprise policy associated with the enterprise subscriber.

* * * * *